(12) United States Patent
Wright et al.

(10) Patent No.: US 12,278,806 B2
(45) Date of Patent: Apr. 15, 2025

(54) OPERATING SYSTEM FOR BLOCKCHAIN IOT DEVICES

(71) Applicant: nChain Licensing AG, Zug (CH)

(72) Inventors: Craig Steven Wright, London (GB); Stephane Savanah, London (GB)

(73) Assignee: NCHAIN LICENSING AG, Zug (CH)

( * ) Notice: Subject to any disclaimer, the term of this patent is extended or adjusted under 35 U.S.C. 154(b) by 0 days.

(21) Appl. No.: 17/381,880

(22) Filed: Jul. 21, 2021

(65) Prior Publication Data
US 2022/0021662 A1     Jan. 20, 2022

Related U.S. Application Data

(63) Continuation of application No. 16/097,497, filed as application No. PCT/IB2017/052465 on Apr. 28, 2017, now Pat. No. 11,128,607.

(30) Foreign Application Priority Data

Apr. 29, 2016    (GB) .................................. 1607476

(51) Int. Cl.
*H04L 29/06*      (2006.01)
*G06F 21/30*      (2013.01)
(Continued)

(52) U.S. Cl.
CPC ........ *H04L 63/0442* (2013.01); *G06F 21/305* (2013.01); *G06F 21/602* (2013.01);
(Continued)

(58) Field of Classification Search
CPC . H04L 63/0442; H04L 63/0823; H04L 9/085; H04L 9/50; H04W 12/03;
(Continued)

(56) References Cited

U.S. PATENT DOCUMENTS 10,050,779 B2    8/2018   Alness et al.
10,158,480 B1 *   12/2018   Winklevoss .......... H04L 9/3247
(Continued)

FOREIGN PATENT DOCUMENTS

GB        2531828 A     5/2016
KR    20060050266 A     5/2006
(Continued)

OTHER PUBLICATIONS

Antonopoulos, "Mastering Bitcoin—Unlocking Digital Cryptocurrencies," O'Reilly Media, Inc., Dec. 20, 2014, 282 pages.
(Continued)

*Primary Examiner* — Joseph P Hirl
*Assistant Examiner* — Chi D Nguy
(74) *Attorney, Agent, or Firm* — Tarolli, Sundheim, Covell & Tummino LLP

(57) ABSTRACT

The invention provides a generic operating system for coordinating, controlling and/or influencing the activities of a device. The invention is implemented using a blockchain platform with which the operating system is arranged to interact. The blockchain may be the Bitcoin blockchain. In a preferred embodiment, the device is an Internet of Things (TOT) device. The invention provides a computer-implemented control system and corresponding method for controlling a device, the system comprising a device configured for wireless communication with a network and having an IP address and a public-private key cryptographic key pair associated with the device; a software-implemented control component arranged to monitor the state of a blockchain network and/or transmit blockchain Transactions to the blockchain network; and a set of instructions arranged for execution by the control component to control the functionality of the device. The control component is arranged to access the set of instructions from a stored location, which (Continued)

is separate to the device. The instructions may be stored in a Distributed Hash Table (DHT) and accessed for download and installation by the control component from the DHT as and when needed. The location of the DHT and/or instructions may be indicated or provided using metadata provided within a blockchain transaction. The set of instructions may be accessed by the control component using a look-up key, which is related to a cryptographic key pair. The control component is provided on or in the device, or in other embodiments can be provided in an off-device location and arranged for wireless communication with the device.

12 Claims, 10 Drawing Sheets

(51) Int. Cl.
| | |
|---|---|
| G06F 21/60 | (2013.01) |
| G06F 21/74 | (2013.01) |
| G06Q 10/06 | (2023.01) |
| G06Q 20/36 | (2012.01) |
| G06Q 20/38 | (2012.01) |
| G06Q 20/40 | (2012.01) |
| H04L 9/08 | (2006.01) |
| H04L 9/40 | (2022.01) |
| H04W 4/70 | (2018.01) |
| H04W 12/03 | (2021.01) |
| H04L 9/00 | (2022.01) |
| H04L 67/12 | (2022.01) |

(52) U.S. Cl.
CPC ............ *G06F 21/74* (2013.01); *G06Q 10/06* (2013.01); *G06Q 20/3678* (2013.01); *G06Q 20/3821* (2013.01); *G06Q 20/3829* (2013.01); *G06Q 20/401* (2013.01); *H04L 9/085* (2013.01); *H04L 63/0823* (2013.01); *H04W 4/70* (2018.02); *H04W 12/03* (2021.01); *G06Q 20/389* (2013.01); *G06Q 2220/00* (2013.01); *H04L 9/50* (2022.05); *H04L 67/12* (2013.01); *H04L 2209/56* (2013.01); *H04L 2209/805* (2013.01)

(58) Field of Classification Search
CPC ...... G06F 21/305; G06F 21/602; G06F 21/74; G06Q 10/06; G06Q 20/3678; G06Q 20/401; G06Q 20/3821; G06Q 20/3829; G06Q 20/389; H04Q 2220/00
See application file for complete search history.

(56) References Cited

U.S. PATENT DOCUMENTS

| | | | |
|---|---|---|---|
| 2005/0161007 | A1 | 7/2005 | Huisma et al. |
| 2014/0304361 | A1* | 10/2014 | Chauhan ............... H04L 67/142 709/216 |
| 2015/0120567 | A1 | 4/2015 | Van Rooyen et al. |
| 2015/0379510 | A1 | 12/2015 | Smith |
| 2016/0086418 | A1 | 3/2016 | Smolen et al. |
| 2016/0098723 | A1 | 4/2016 | Feeney |
| 2016/0162897 | A1* | 6/2016 | Feeney ................. H04L 9/3236 705/71 |
| 2016/0261685 | A1 | 9/2016 | Chen et al. |
| 2016/0299918 | A1 | 10/2016 | Ford |
| 2017/0178127 | A1* | 6/2017 | Kravitz ............ G06Q 20/38215 |
| 2019/0162897 | A1 | 5/2019 | Munige et al. |

FOREIGN PATENT DOCUMENTS

| | | |
|---|---|---|
| KR | 20080052215 A | 6/2008 |
| WO | 2015144971 A1 | 10/2015 |

OTHER PUBLICATIONS

Charities Aid Foundation, "Blockchain technology could revolutionise charitable giving—report," Dec. 16, 2015, https://www.cafonline.org/about-us/media-office/blockchain-technology-could-revolutionisecharitable-giving, 2 pages.
Crosby et al., "BlockChain Technology: Beyond Bitcoin," University of California Berkeley, Sutardja Center for Entrepreneurship & Technology Technical Report, Oct. 16, 2015, 35 pages.
Forte et al., "Beyond Bitcoin—Part I: A critical look at blockchain-based systems," IACR Cryptology ePrint Archive 2015:1164, Dec. 1, 2015, 34 pages.
International Search Report and Written Opinion mailed Apr. 28, 2017, Patent Application No. PCT/IB2017/052465, 12 pages.
Mike et al., "Smart Property," Bitcoin Wiki, page created Sep. 4, 2011, last edited Jul. 16, 2018, https://en.bitcoin.it/wiki/Smart_Property, 3 pages.
Nakamoto, "Bitcoin: A Peer-to-Peer Electronic Cash System," Bitcoin, Oct. 31, 2008, https://bitcoin.org/bitcoin.pdf, 9 pages.
Panikkar et al., "Adept: An IoT Practitioner Perspective," IBM, Jan. 2015, 18 pages.
Prisco, "Slock. It to Introduce Smart Locks Linked to Smart Ethereum Contracts, Decentralize the Sharing Economy," Bitcoin Magazine, Nov. 5, 2015, https://bitcoinmagazine.com/articles/slock-it-to-introduce-smart-locks-linked-to-smart-ethereum-contracts-decentralize-the-sharing-economy-1446746719, pages.
Slockit, "Integrated IoT + Blockchain—3 minute demo," Youtube, https://www.youtube.com/watch?v=Ht23KXic1k, Nov. 27, 2015, 3 pages.
Slockit, "Slock.it DAO demo at Devcon1: IoT + Blockchain," VoiceTube transcription of https://www.youtube.com/watch?v=49wHQoJxYPo, Nov. 13, 2015, 7 pages.
Talerecursion, "Forum Post on r/slockit," Reddit, https://www.reddit.com/r/slockit/comments/4dk24k/use_cases_for_the_ethereum_computer/, Apr. 2016, 1 page.
Theprotocoltv, "IBM & Samsung live demo of Adept | TheProtocol. TV," Youtube, https://www.youtube.com/watch?v=U1XOPlqyP7A, Feb. 3, 2015, 3 pages.
Tual et al., "IoT Interview Series: Decentralized Smart Devices with Stephan Tual from Slock.it," Postscapes, https://www.postscapes.com/iot-voices/interviews/smart-devices-ethereum-stephan-tual/, [retrieved Feb. 27, 2019], 8 pages.
UK Commercial Search Report mailed Nov. 9, 2016, Patent Application No. 1607476.7, 7 pages.
UK IPO Search Report mailed Dec. 28, 2016, Patent Application No. 1607476.7, 4 pages.
Vigna et al., "The car of the future may ownerless as well as driverless," MarketWatch, Mar. 3, 2015, http://www.marketwatch.com/story/how-bitcoin-technology-could-power-driverless-cars-2015-03-03, 7 pages.
Satoshi et al., "Connection Limits," Bitcoin Forum, Aug. 9, 2010, https://bitcointalk.org/index.php?topic=741.0;prev_next=prev, 2 pages.
IBM, "Adept: An IoT Practitioner Perspective", 2015, 18 pages.
Van Wirdum, "The Teechan Solution: Scaling Bitcoin With Trusted Hardware" Bitcoin Magazine, Dec. 27, 2016, 9 pages.
International Search Report and Written Opinion mailed Jul. 4, 2017, Patent Application No. PCT/IB2017/052465, 12 pages.
Fotiou et al., "Decentralized Name-based Security for Content Distribution Using Blockchains", Apr. 2016, IEEE Conference on Computer Communicaitons Workshops, 6 pages.

* cited by examiner

| A | B | X |
|---|---|---|
| 0 | 0 | 0 |
| 1 | 0 | 1 |
| 0 | 1 | 1 |
| 1 | 1 | 0 |

Fig. 2

OPERATING SYSTEM FOR BLOCKCHAIN IOT DEVICES

CROSS-REFERENCE TO RELATED APPLICATIONS

This application is a continuation of U.S. patent application Ser. No. 16/097,497, filed Oct. 29, 2018, entitled "OPERATING SYSTEM FOR BLOCKCHAIN IOT DEVICES," which is a 371 Nationalization Patent Application of International Patent Application No. PCT/IB2017/052465, filed Apr. 28, 2017, entitled "OPERATING SYSTEM FOR BLOCKCHAIN IOT DEVICES," which claims priority to United Kingdom Patent Application No. GB1607476.7, filed Apr. 29, 2016, entitled "OPERATING SYSTEM FOR BLOCKCHAIN IOT DEVICES," the disclosures of which are incorporated herein by reference in their entirety.

FIELD OF INVENTION

This invention relates generally to distributed ledger (blockchain) technology. This may be any blockchain-related technology, including (but not limited to) the Bitcoin Blockchain. Aspects of the invention relate also to the Internet of Things (IoT). The invention may be suited for controlling an IoT device.

BACKGROUND OF INVENTION

In this document we use the term 'blockchain' to include all forms of electronic, computer-based, distributed ledgers. These include consensus-based blockchain and transaction-chain technologies, permissioned and un-permissioned ledgers, shared ledgers, side chains and alt chains, and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention. The term "user" may refer herein to a human or a processor-based resource. A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be 'validated'. Network nodes (miners) perform work to ensure that each transaction is valid, with invalid transactions being rejected by the network. Software clients installed on the nodes perform this validation work on an unspent transaction (UTXO) by executing its locking and unlocking scripts. If execution of the locking and unlocking scripts evaluates to TRUE, the transaction is valid. Many of the commands in the scripting language return Boolean values (e.g. OP-EQUAL) which enables conditionality to be built into blockchain transactions.

Blockchain technology is most widely known for the use of cryptocurrency implementation. However, in more recent times, digital entrepreneurs have begun exploring both the use of the cryptographic security system Bitcoin is based on, and the data that can be stored on the Blockchain, to implement new systems. The present invention relates to one such new and inventive use of blockchain technology.

In particular, it relates to the use of a blockchain to implement simple yet effective and powerful mechanisms for the creating a wide and varied range of computer-implemented systems. Such systems can include control units and control systems for automating and controlling processes and/or directing the behaviour of devices.

Such devices may include IOT devices. IOT devices are embedded with electronic circuits, software, sensors, and networking capabilities etc. to enable them to communicate with other devices and systems, often via wireless means, and to perform desired tasks. In some cases, they may be extremely small and contain only limited processing and memory capacity. This poses a problem if the software required for the device's task is large and complex. Furthermore, as the software and hardware needed to provide the IoT connectivity and intelligence is provided on or in the device itself, its installation, maintenance and upgrade etc become more difficult and expensive. Further still, the excitement in recent years over the IOT's potential has been tempered with concerns regarding security.

Prior art disclosure "ADEPT: An IoT Practitioner Perspective" of January 2015 discloses an approach to integrating blockchain technology with IoT devices. At the time of filing, this was retrievable from https://ia902601.us.archive.org/4/items/pdfy-esMcC00dKmdo53-/IBM%20ADEPT%20Practictioner%20Perspective%20-%20Pre%20Publication%20Draft%20-%207%20Jan%202015.pdf. This disclosure (hereafter "ADEPT") describes a washing machine device managed by a contract and communicating, via a blockchain, with a retailer to purchase supplies upon satisfying the condition of "running low on detergent".

However, while ADEPT discloses how an IoT system could operate against the blockchain, there is no address of the problem of how such a system could be arranged, configured or technically influenced using the blockchain. In other words, while ADEPT explains how software on the IoT could interact autonomously with the blockchain, there is no discussion or disclosure of how one could get the software onto the device in the first instance or, moreover, how one could then change the behaviour of that device during use/operation/deployment.

Thus, it would be an advantage to have an operating system that is generic (i.e., non device specific) yet small enough to be loaded into any device while retaining strong cybersecurity. Preferably, such an operating system would provide dynamic functionality for the device, rather than static functionality. In other words, it would be a significant technical advantage if one could alter the configuration, set-up and functionality of the device(s) in a simple, efficient and dynamic manner. Such a technical solution is not address in the prior art such as ADEPT. A further advantage over known prior art would be the capability of enabling a simple, secure and robust control functionality including the possibility of processing payments for services provided by the device. The present invention addresses these goals, and others, by interfacing IOTs to a Blockchain protocol such as, for example, the Bitcoin protocol.

Thus, in accordance with the present invention there is provided a system and method as defined in the appended claims.

The invention may provide a computer-implemented system and method. It may be described as a control method because it controls, directs and/or influences the activities of one or more devices. The invention may be described as an operating system. It may be software-implemented.

It may comprise an operating system for coordinating, controlling and/or influencing the activities of at least one device. The operating system may be generic in the sense that it is independent of the device which it controls.

The invention may be implemented using a blockchain platform with which the operating system ("control component") is arranged to interact. The blockchain may be the Bitcoin blockchain. In a preferred embodiment, the device is an Internet of Things (TOT) device.

The invention may provide a computer-implemented control system for controlling a device. The system may comprise:

a device configured for wireless communication with a network and having an IP address and a public-private key cryptographic key pair associated with the device;

a software-implemented control component arranged to monitor the state of a blockchain network and/or transmit blockchain Transactions to the blockchain network; and/or a set of instructions arranged for execution by the control component to control the functionality of the device.

The control component may be arranged to access the set of instructions from a stored location which is separate to the device i.e. "off device".

The control component may be arranged to receive an input signal from an input source.

The input source may be:
a further device; and/or
a computer-based resource or agent.

The computer-based agent or resource may be substantially as described below.

The set of instructions may be stored in a Distributed Hash Table (DHT) and accessed for download and installation by the control component from the DHT. An advantage of this is that it provides the ability to change the instructions (and thus the functionality of the device).

The location of the DHT may be indicated or provided using metadata provided within a blockchain transaction. An advantage of this is that the location of the instructions is recorded immutably within the blockchain. A permanent and tamper-proof record is therefore provided, and the location can be verified by any party with access to the blockchain. Thus, security and verification are enhanced.

The set of instructions may be accessed by the control component using a look-up key which is related to a cryptographic key pair.

The control component may be provided on or in the device. It may be provided in an off-device location and arranged for wireless communication with the device.

The control component may be arranged to:
Perform cryptographic calculations;
Access its associated private/public key pair;
have an associated Bitcoin or other blockchain-related address;
operate the device via an API;
perform secret sharing protocol operations.

This may be in accordance with a secret sharing protocol substantially as described below.

The control component may be arranged to influence or control the activities of the device(s) based upon detection of a valid blockchain transaction.

The invention may provide a system and/or method substantially as described below.

The invention may provide a computer-implemented control method arranged to control a device, or a plurality of devices. The method may comprise the steps:

providing a device configured for (wireless) communication with a network and having an IP address and a public-private key cryptographic key pair associated with the device;

providing a software-implemented control component arranged to monitor the state of a blockchain network and/or transmit blockchain Transactions to the blockchain network;

providing a set of instructions arranged for execution by the control component to control the functionality of the device.

The control component may be arranged to access the set of instructions from a stored location which is separate to the device. The control component may be arranged to receive an input signal from an input source, wherein the input source may be:

a further device; and/or
a computer-based resource or agent.

The set of instructions may be stored in a Distributed Hash Table (DHT) and accessed for download and installation by the control component from the DHT.

The location of the DHT may be indicated or provided using metadata provided within a blockchain transaction. The set of instructions may be accessed by the control component using a look-up key which is related to a cryptographic key pair.

The control component may be provided on or in the device. It may be provided in an off-device location and arranged for wireless communication with the device.

The control component may be arranged to:
Perform cryptographic calculations;
Access its associated private/public key pair;
have an associated Bitcoin or other blockchain-related address;
operate the device via an API;
perform secret sharing protocol operations.

The control component may be arranged to influence or control the activities of the device based upon detection of a valid blockchain transaction.

Any feature described in relation to one embodiment or aspect of the invention may also apply to any other feature or embodiment of the invention. For example, any feature mentioned in relation to the system may apply to the method and vice versa.

These and other aspects of the present invention will be apparent from and elucidated with reference to, the embodiment described herein. An embodiment of the present invention will now be described, by way of example only, and with reference to the accompany drawings, in which:

FIG. 2 illustrates a truth table for the control system of FIG. 1;

FIG. 9 shows an overview of a technique in which two Boolean inputs A and B are evaluated within the locking script of a first transaction to produce a Boolean output X.

FIG. 10 shows an overview of a technique for implementing a logic gate using first and second blockchain transactions.

FIG. 11 illustrates a process in which the locking script of a blockchain transaction is used to implement the functionality of a logic gate.

Figure 1:
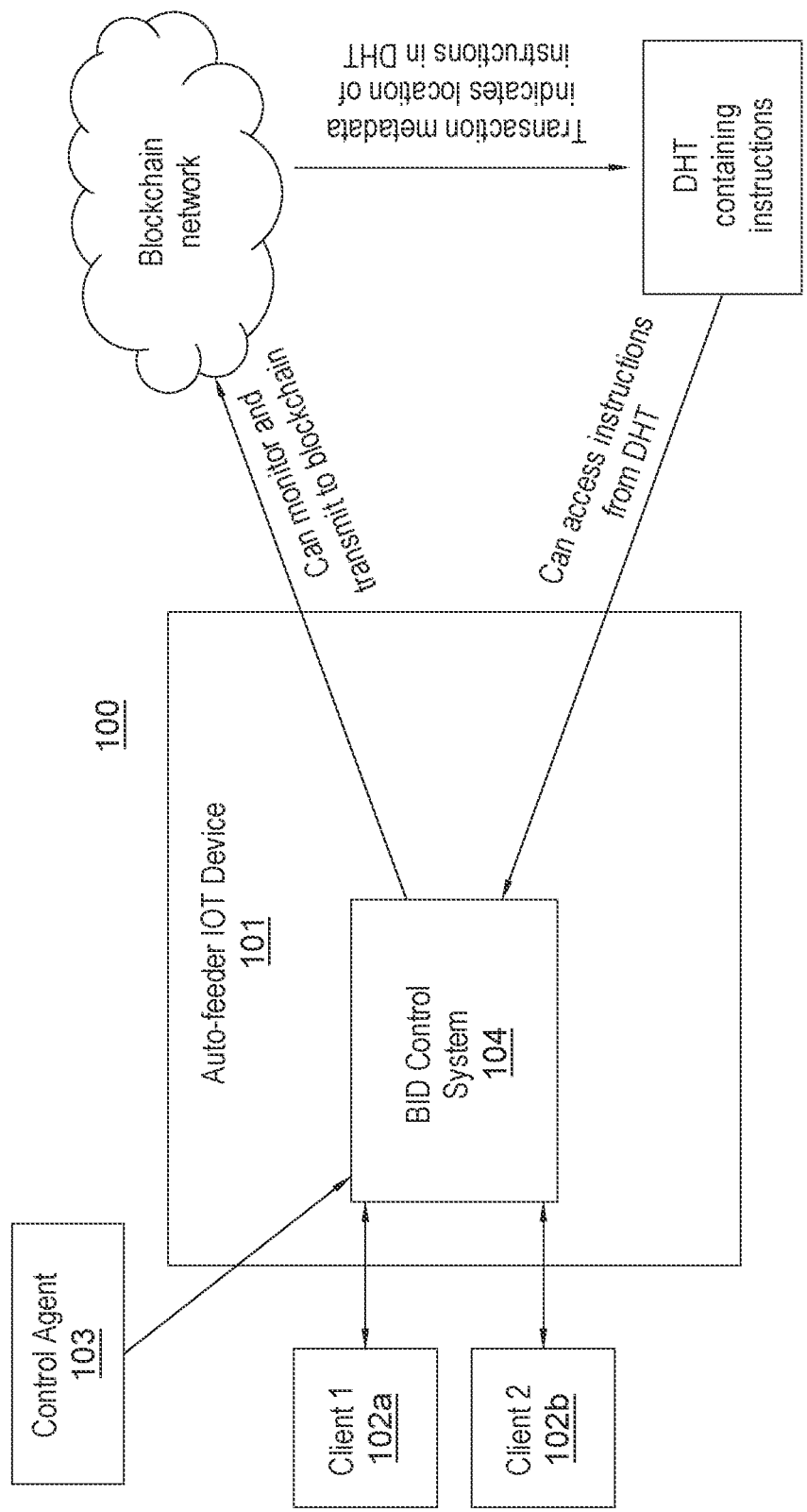
FIG. 1 illustrates a system configured in accordance with an embodiment of the invention and in relation to an illustrative use case.

The present invention provides the following advantages, amongst others:

It provides an Operating System which is purposefully 'thin' (small size in respect of memory and/or processing requirements) and which can, therefore, be implemented on any IOT device It can be easily 'upgraded' as device-specific functionality is not hard-coded into the device, but rather loaded in from a secure repository such as a Distributed Hash Table (DHT); this is a significant technical improvement over the prior art, which does not facilitate dynamic configuration;

It can be controlled and managed by autonomous computing Agents (either than software which is resident on the IOT device or external thereto)

As it interfaces with the Blockchain e.g. Bitcoin platform this enables the integration of payment processing functionality It provides robust security based on blockchain cryptography such as the bitcoin ECC.

A Blockchain IOT Device (BID) is a computing Agent that is set up to execute predetermined instructions which are stored securely off-BID and accessed via cryptographic keys. By 'off-BID' we mean that the instructions are not provided within the BID itself, but are stored elsewhere and accessed as and when required. These instructions are selected and arranged to perform a chosen task or plurality of tasks. When executed, the instructions can control and influence the behaviour of the IOT device. In a preferred embodiment the BID resides on the IOT itself, meaning that the BID is installed in memory provided in or on the ITO device. However, in other embodiments the BID may reside off-device and have internet connectivity to the device.

The IOT device has its own cryptographic key (as well as an IP address) so it can securely communicate and interact with other devices or DHTs, etc. Its 'operating system' is a simple, generic system with some embedded functionality for (at least, but not limited to):

cryptographic calculations retrieving instructions from an external source (such as a DHT)

performing simple actions such as toggling switches (i.e. as on the physical IOT device)

Thus, neither the IOT device nor its associated BID contain their own built-in instructions and neither 'knows' what it does or how to do it. The BID only contains a mechanism for securely retrieving instructions from elsewhere. A BID can only perform a set of simple actions (the following are illustrative only and not limiting):

Access to its own master private and public key pair; it also has its own (derivable) BTC address.

Ability to send data to an IP address or receive data from an IP address

Secret Sharing protocol calculations (as described below)—in a preferred embodiment these may be embedded in machine code Look up and interpret Blockchain events Operate and control the physical device it is attached to (via a standard API that is essentially just a set of switches)

The BID's incoming and outgoing communications are encrypted using a security mechanism as described below, which enables keys to be created using shared secrets. This allows:

(i) greater security from 'hacking'

(ii) simple universal software upgrade protocols (iii) device agnosticism

The invention, therefore provides a generic operating system which is usable in any IOT device. The device itself is not programmed—all programs are stored separately and loaded into the device at set-up time (or, in some embodiments, at execution time).

EXAMPLE USE OF THE INVENTION

The following illustrative example relates to the use of an embodiment of the invention for the control of an Auto-feeder IOT device. It is provided for illustrative purposes only, as an example of how one implementation of the invention may be used.

Turning to FIG. 1, system 100 comprises first and second client devices, respectively enumerated as 102a and 102b, and a BID control system 104 which is operative to receive inputs from the first 102a and second 102b client devices and to transmit information to first 102a and second 102b client devices. In this example use case, first and second client devices 102a, 102b are radio frequency identification devices (RFIDs) which are detectable by BID control system 104. Control system 104 is operative to use a blockchain and is operative to transmit outputs to a blockchain.

We will describe how control system 104 works using an example of Carol's two dogs, named Archimedes (A) and Bertrand (B), who are left alone all day in the back yard and they are both friendly to each other provided they do not eat at the same time, which for some reason causes them to become aggressive and fight each other. A and B both have identifying RFID collars i.e. first RFID collar 102a and second RFID collar 102b, which are detectable by an Internet Of Things (IOT) device 101. This IOT device is an auto-feeder which dispenses specified quantities of food for consumption by one of the dogs, i.e. the BID control system 104 controls the operation of the IOT feeding device.

In this example, the BID 104 is a software resource or component which is provided on the IOT auto-feeder and interfaces with the feeder to control its functions.

The BID begins its life by downloading and installing its instructions from the DHT. It does not need to do this again until those instructions are modified. This might be, for example, when the BID needs to be upgraded or when the BID's behaviour is to be completely modified e.g its instruction set might be modified to detect three or more RFID signal.

The Control Agent uses the values transmitted by the BID to create a blockchain transaction, and also shares new secrets with the BID after each iteration as explained below.

The functionality of the BID control system 104 is implemented using a blockchain transaction which is locked using the locking script:

OP_HASH160<unlocking script hash> OP_EQUAL

Transactions are created to provide (via metadata linking to a distributed hash table (DHT)) a set of instructions to control the IOT auto-feeder device and may include instructions to a computing resource established in accordance with what is described below. The metadata can include a pointer or reference to a location where the instructions can be accessed, rather than storing the instructions within the transaction itself. Thus, the instructions may be held 'off-block'.

The Blockchain provides not only a mechanism for controlling activities but also to record information about events that have taken place e.g. it provides the ability to count the number of feedings, what time they occurred, which dog ate, whether maximum food allocation has been dispensed, etc. It also provides cryptographic security.

Figure 2:
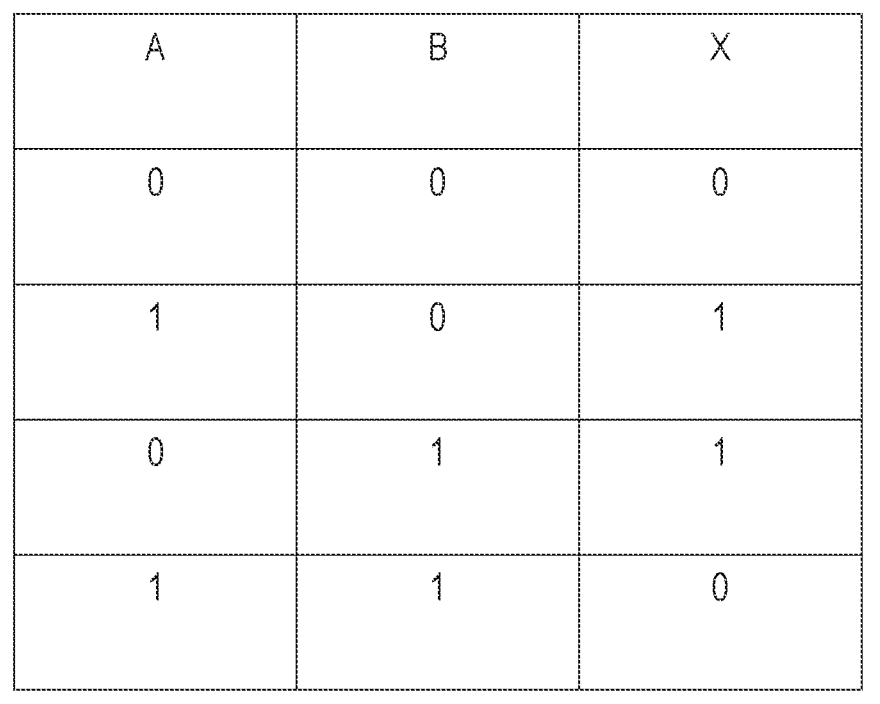
Figure 9:
FIGS. 9 to 11 show aspects of an implementation wherein the locking script of a blockchain transaction is used to implement the functionality of a logic gate.
Figure 10:
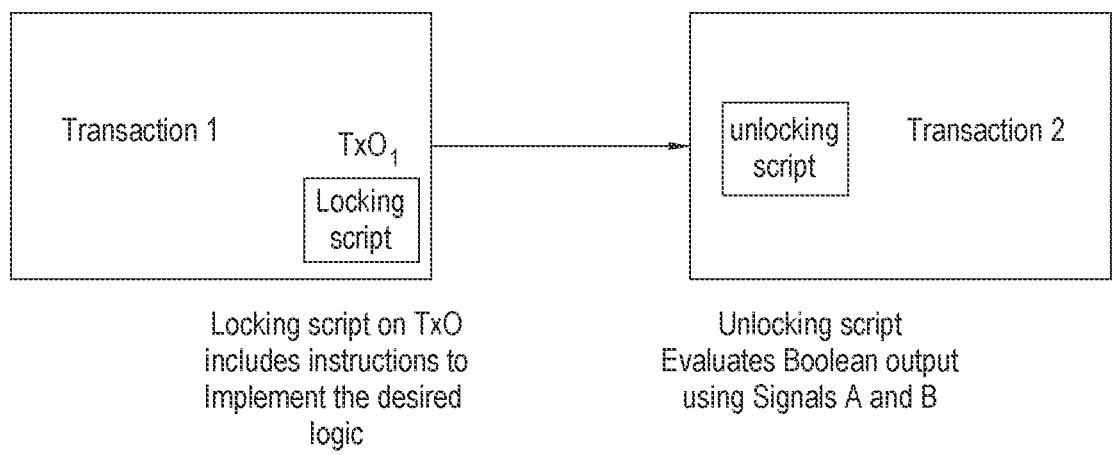
Figure 11:
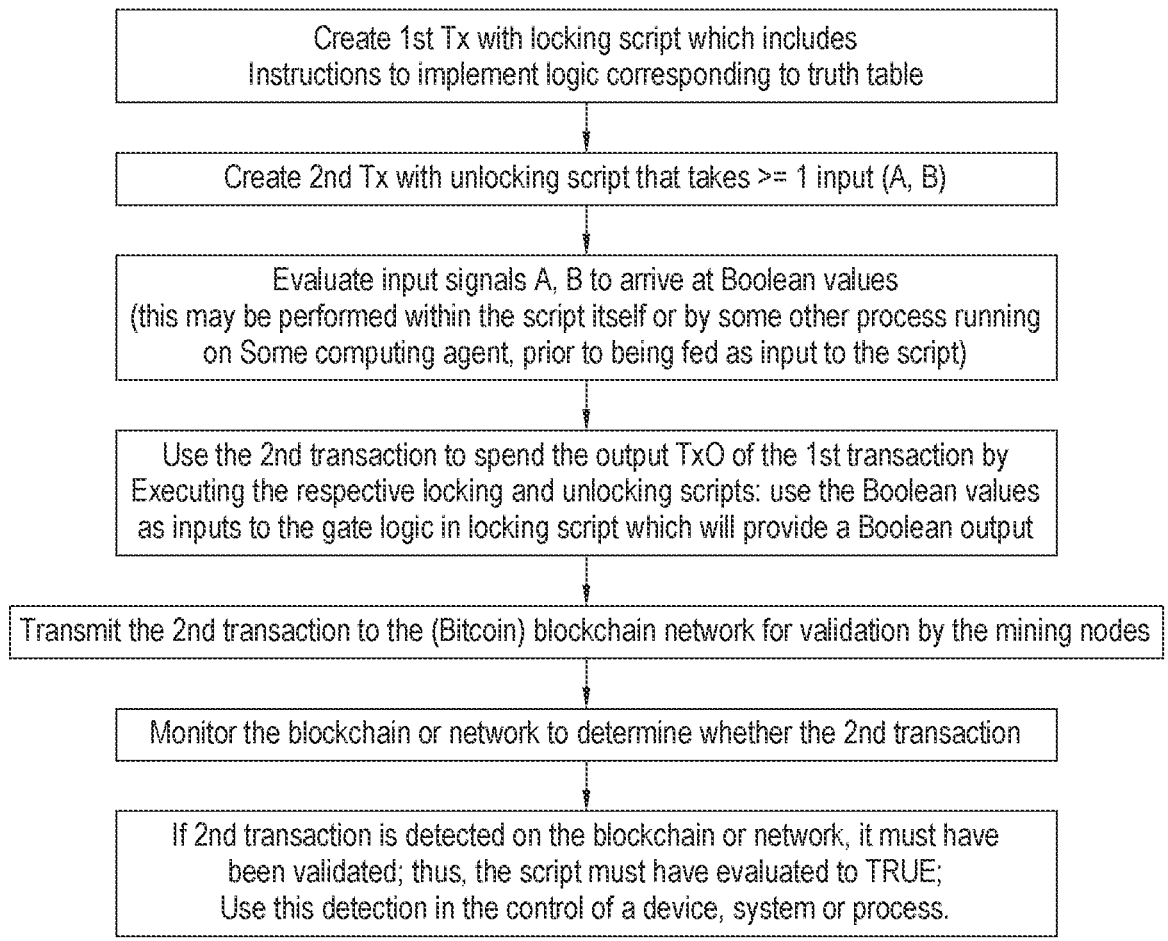

An important function of the transaction is to ensure that food is dispensed only if one dog is present at the feeder at the same time. Therefore, some conditionality needs to be built into the transaction's script. This is achieved with an XOR function as per the truth table illustrated in FIG. 2 and with reference to FIGS. 9 to 11:

if neither A nor B are at the feeder, do not dispense food
if A is at the feeder but not B, dispense food;
if B is at the feeder but not A, dispense food;
if both A and B are at the feeder, do not dispense food.

When A or B are at the feeder an RFID signal is transmitted to the auto-feeder's control system 104, from the respective client device, i.e. first RFID collar 102a or second RFID collar 102b, to unlock that dog's secure current puzzle solution (which is securely replaced with a new puzzle solution after each iteration). If A or B are not at the feeder, a random number is instead transmitted from the respective RFID collar to the feeder. In other words, a dog being 'at the feeder' means its RFID collar is within detectable range of the feeder. If this is the case, the relevant puzzle is unlocked for transmission. If not, the default is a random number.

As is known in the art, a puzzle solution is data which, when hashed, results in a value that provides a match when compared with the stored value within a (bitcoin) script. That is, the process is: a secret value (the 'solution') is hashed and stored within a locking script for later comparison. To unlock the locking script the secret is presented to the script via an unlocking (redeem). The presented value is hashed and then compared with the stored hash. If the comparison determines that they are equal then the result of the comparison is 'TRUE'. In practice, the stored value is the DOUBLE-hash of the secret, and the value presented is a SINGLE-hash of the secret. This enables any length of secret to be reduced to a standard manageable size for input to the script (i.e. always 160 bits long).

The Auto-feeder BID executes its instructions which were retrieved from a DHT using a look-up key that is related to the BID's key/pair. The Control Agent manages the data flow to/from the BID (i.e. data relating to the RFID signals, not related to the BID's instruction set). Thus, the Auto-feeder BID monitors its own state. It stores two secret values (S1 and S2) received from the separate Control Agent 103. The Control Agent 103 can be a suitably programmed computing resource arranged to oversee the feeding process. The secret values S1 and S2 are used conditionally when the dogs' RFID collars are detected within range. Based on its instructions as retrieved from the appropriate DHT, on detection of an RFID within range (along with other conditions related to the time of day; number of previous feedings; other restrictions; etc.) it sends a signal to a Generic Agent acting as its Control Agent (see below). The signal includes:

S1 (=Puzzle-A-Solution) if Archimedes' RFID is detected else Random Number
S2 (=Puzzle-B-Solution) if Bertrand's RFID is detected else Random Number The Auto-Feeder BID then:

The Autofeeder checks for a valid transaction on the network (which may or may not yet be published on a Block, but which must be a valid transaction).

This transaction is created and broadcast by the Control Agent. It is valid if the embedded XOR test has passed. If not passed, then it will be invalid and will not be propagated beyond the first hop on the network. Thus it will not be detected by the BID. Or, if the BID is on the first hop and therefore the transaction is detected, part of the BID's function (as for any other node) is to validate the transaction. So it will be able to detect if the transaction is valid before it takes it consequent action. The valid transaction also guarantees that the required information has been stored and recorded on the blockchain i.e., regarding the feeding event.

If the above answer is TRUE then the BID performs its conditioned instruction—in this case, it dispenses some food
Receives a transmission from the Control Agent 103 enabling it to share two secrets (S1 and S2, as per below) and internally updates these secret values ready for next iteration.

The locking script for the Bitcoin transaction is given by:
OP_HASH160 <Puzzle-A> OP_EQUAL OP_SWAP
OP_HASH160 <Puzzle-B> OP_EQUAL
OP_NUMEQUAL OP_NOT OP_VERIFY
OP_1 metadata1 PubK-Carol OP_2 OP_CHECKMULTSIG Where:
Puzzle-A is the equivalent result of OP_HASH160 (Puzzle-A-Solution)
Puzzle-B is the equivalent result of OP_HASH160 (Puzzle-B-Solution)
Metadata1 Contains a reference to codified instructions stored in a DHT.
PubK-Carol is Carol's public key Note that the Agent's programming may be hard coded or it too may retrieve its own instructions from a DHT.

The codified instructions may be stored and accessed in accordance with the procedure set out below for referencing a contract from a blockchain transaction using metadata.

Carol's public key may be securely held or recreatable using the process set out below.

In order to unlock the illustrative blockchain transaction shown above, the following script will be required:

Sig-Carol Puzzle-B-solution Puzzle-A-Solution <unlocking script>

Figure 3:
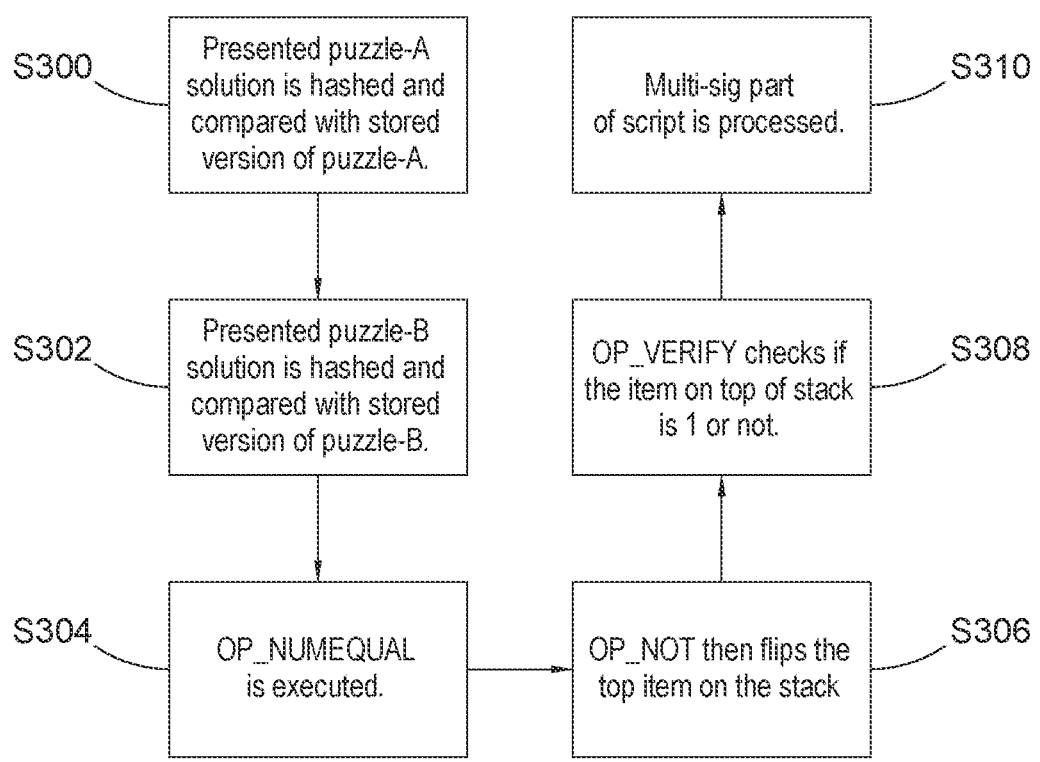
FIG. 3 illustrates the steps in the processing of the unlocking transaction for the example of FIG. 1.

We refer to FIG. 3 for an illustration of the following steps.

Control system 104 is operative to hash the presented puzzle-A solution and compare it with a stored version of puzzle-A (in which the version is a hash of the solution) that is retrieved from storage in step S300. The stored version of puzzle-A may be stored in storage local to the control system 104 or on any other suitable storage medium. If they are equal then the top of stack=1 and if they are different the top of stack=0.

The top of stack is then swapped with the second item on the stack which is puzzle-B solution in a step S302. This is hashed and compared with a stored version of puzzle-B which is retrieved from storage, again pushing 1 or 0 onto the top of the stack in a similar vein to the outcome from S300. The stored version of puzzle-B may be stored in storage local to the control system 104 or on any other suitable storage medium.

At this point the top two stack items are each either 0 or 1. In step S304 OP_NUMEQUAL then returns 1 if the numbers are equal, 0 otherwise, which is the exact reverse of the XOR truth table.

In step S306, OP_NOT then flips the top item on the stack to produce the required XOR result.

In step S308, OP_VERIFY then checks if the item on the top of the stack is 1 and if not, i.e. if the XOR operation has failed, the transaction is immediately marked as invalid as more than a single input from the first and second client devices has returned a matching puzzle solution. The result of this is that no food is dispensed from the IOT dispenser as more than a single dog is at the IOT dispenser. That is to say, the output of the control system 104 is controlled by the execution of the underlying Bitcoin transaction.

If OP_VERIFY returns 1 then the processing in control system 104 returns to the multi-sig part of the script where the presence of the signature of Carole is checked in step S310.

The stack operations performed by control system 104 in analysing the unlocking script are shown below. Firstly, control system 104 hashes the unlocking script to compare the hash with the hash of the unlocking script using OP_EQUAL. Following this, the unlocking script is then executed.

| Stack | Script | Description |
|---|---|---|
| Empty | Sig-Carol Puzzle-B-solution Puzzle-A-Solution OP_HASH160 <Puzzle-A> OP_EQUAL OP_SWAP OP_HASH160 <Puzzle-B> OP_EQUAL OP_NUMEQUAL OP_NOT OP_VERIFY OP_1 metadata1 PubK-Carol OP_2 OP_CHECKMULTSIG | |
| Sig-Carol Puzzle-B-solution Puzzle-A-Solution | OP_HASH <Puzzle-A>_ OP_EQUAL OP_SWAP OP_HASH160 <Puzzle-B> OP_EQUAL OP_NUMEQUAL OP_NOT OP_VERIFY OP_1 metadata1 PubK-Carol OP_2 OP_CHECKMULTSIG | data added to the stack |
| Sig-Carol Puzzle-B-solution Puzzle-A-Solution-hashed | <Puzzle-A> OP_EQUAL OP_SWAP OP_HASH160 <Puzzle-B> OP_EQUAL OP_NUMEQUAL OP_NOT OP_VERIFY OP_1 metadata1 PubK-Carol OP_2 OP_CHECKMULTSIG | The top stack item is hashed |
| Sig-Carol Puzzle-B-solution Puzzle-A-Solution-hashed <Puzzle-A> | OP_EQUAL OP_SWAP OP_HASH160 <Puzzle-B> OP_EQUAL OP_NUMEQUAL OP_NOT OP_VERIFY OP_1 metadata1 PubK-Carol OP_2 OP_CHECKMULTSIG | The given hash (puzzle-A) is pushed to the top of the stack |
| Sig-Carol Puzzle-B-solution FALSE | OP_SWAP OP_HASH160 <Puzzle-B> OP_EQUAL OP_NUMEQUAL OP_NOT OP_VERIFY OP_1 metadata1 PubK-Carol OP_2 OP_CHECKMULTSIG | The top two items are compared and the result (FALSE) pushed to the top of the stack |
| Sig-Carol FALSE Puzzle-B-solution | OP_HASH160 <Puzzle-B> OP_EQUAL OP_NUMEQUAL OP_NOT OP_VERIFY OP_1 metadata1 PubK-Carol OP_2 OP_CHECKMULTSIG | The two top stack items are swapped |
| Sig-Carol FALSE Puzzle-B-solution-hashed | <Puzzle-B> OP_EQUAL OP_NUMEQUAL OP_NOT OP_VERIFY OP_1 metadata1 PubK-Carol OP_2 OP_CHECKMULTSIG | The top stack item is hashed |
| Sig-Carol FALSE Puzzle-B-solution-hashed <Puzzle-B> | OP_EQUAL OP_NUMEQUAL OP_NOT OP_VERIFY OP_1 metadata1 PubK-Carol OP_2 OP_CHECKMULTSIG | The given hash (puzzle-B) is pushed to the top of the stack |
| Sig-Carol FALSE TRUE | OP_NUMEQUAL OP_NOT OP_VERIFY OP_1 metadata1 PubK-Carol OP_2 OP_CHECKMULTSIG | The top two items are compared and the result (TRUE) pushed to the top of the stack |
| Sig-Carol FALSE | OP_NOT OP_VERIFY OP_1 metadata1 PubK-Carol OP_2 OP_CHECKMULTSIG | The top two numbers (0 or 1) are compared and the result (FALSE) pushed to the top of the stack |
| Sig-Carol TRUE | OP_VERIFY OP_1 metadata1 PubK-Carol OP_2 OP_CHECKMULTSIG | The top stack item is flipped (from FALSE = 0 to TRUE = 1) |

| Stack | Script | Description |
|---|---|---|
| Sig-Carol | OP_1 metadata1 PubK-Carol OP_2 OP_CHECKMULTSIG | Top stack item is verified. As it is TRUE, the transaction is not (yet) marked invalid and the script continues |
| TRUE | Empty | Multi-sig is checked and passes. |

Creating a Key Using a Shared Secret

A key may be securely held or recreated. Particularly, in the case of a private key which may be used to derive a public key, the private key may be stored in parts.

The user, i.e., Alice or Bob, may keep one part of their private key, a service provider may keep a second part and a third part may be kept at a remote secure site. The private key may be reconstituted using any two of the three parts, or, more generally, the private key may be reconstituted using any m of n parts.

If the private key can be reconstituted then it can be used to recreate a public key at the point of use and then the private key and the public key can be discarded again after use.

Splitting private keys may be achieved using Shamir's Secret Sharing Scheme. Private key-public key pairs may be deterministically derived from a master key using the following method. This method enables secret values to be shared by participants without ever transmitting them.

The system may generate a public key for a participant using a method of sub-key generation as now described.

Figure 4:
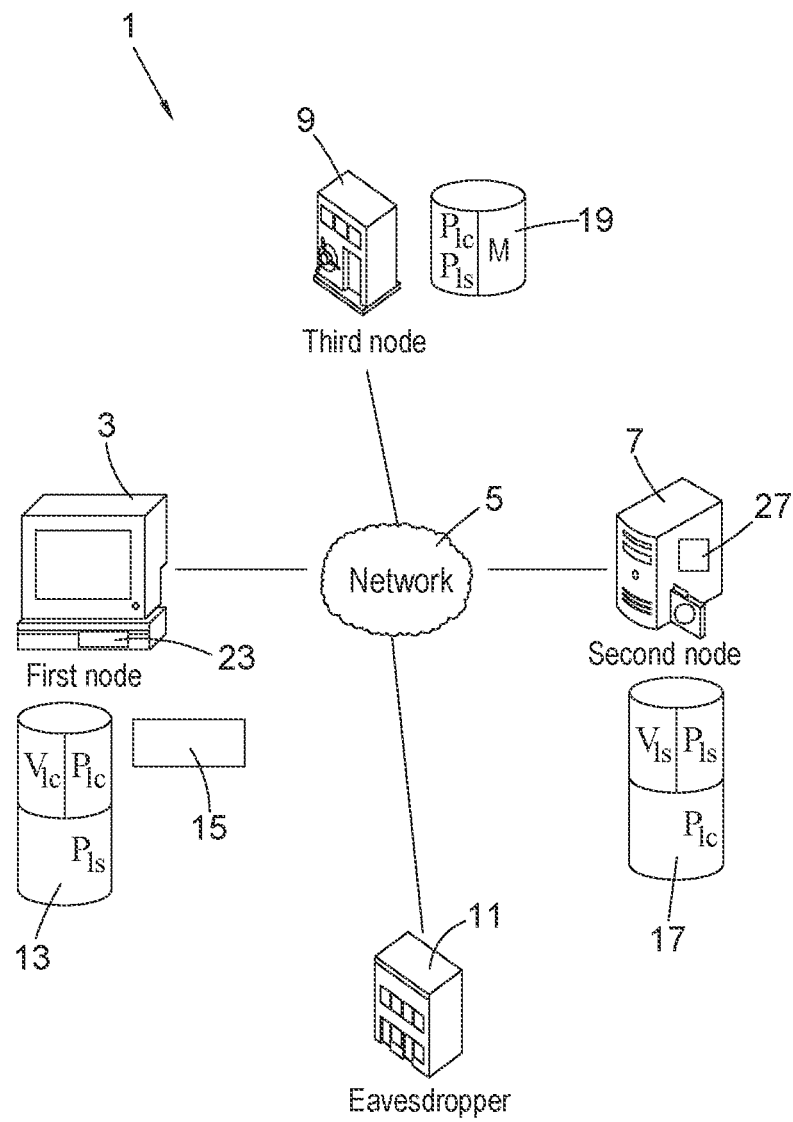
FIGS. 4 to 8 illustrate a technique which can be used to share a secret and generate a public or private key.
Figure 5:
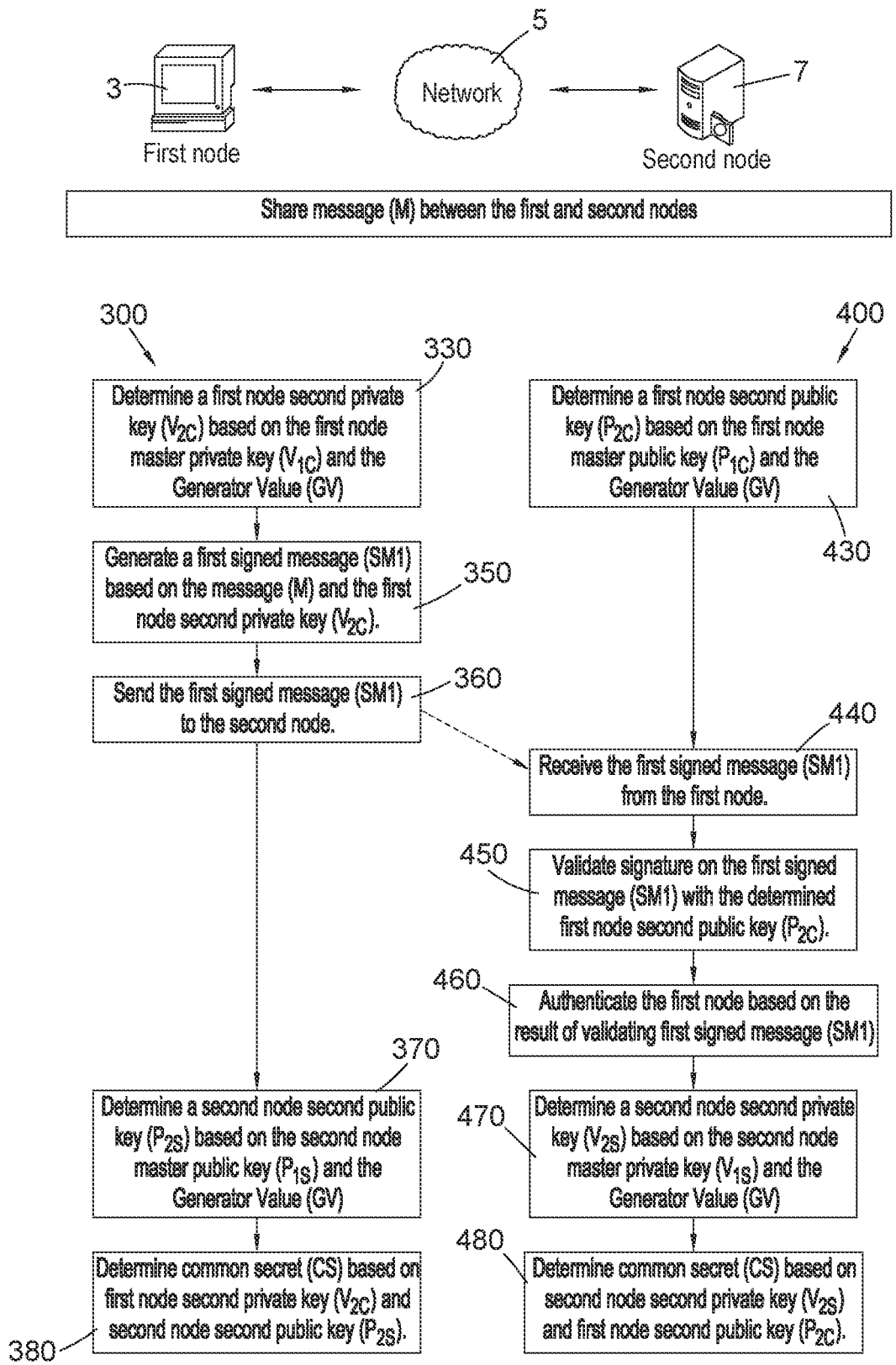

FIG. 4 illustrates a system 1 that includes a first node 3 which is in communication with a second node 7 over a communications network 5. The first node 3 has an associated first processing device 23 and the second node 5 has an associated second processing device 27. The first and second nodes 3, 7 may include an electronic device, such as a computer, phone, tablet computer, mobile communication device, computer server etc. In one example, the first node 3 may be a client (user) device and the second node 7 may be a server. The server may be a digital wallet provider's server.

The first node 3 is associated with a first asymmetric cryptography pair having a first node master private key ($V_{1C}$) and a first node master public key ($P_{1C}$). The second node (7) is associated with a second asymmetric cryptography pair having a second node master private key ($V_{1S}$) and a second node master public key ($P_{1S}$). In other words, the first and second nodes are each in possession of respective public-private key pairs.

The first and second asymmetric cryptography pairs for the respective first and second nodes 3, 7 may be generated during a registration process, such as registration for a wallet. The public key for each node may be shared publicly, such as over communications network 5.

To determine a common secret (CS) at both the first node 3 and second node 7, the nodes 3, 7 perform steps of respective methods 300, 400 without communicating private keys over the communications network 5.

The method 300 performed by the first node 3 includes determining 330 a first node second private key ($V_{2C}$) based on at least the first node master private key ($V_{1C}$) and a Generator Value (GV). The Generator Value may be based on a message (M) that is a shared between the first and second nodes, which may include sharing the message over the communications network 5 as described in further detail below. The method 300 also includes determining 370 a second node second public key ($P_{2S}$) based on at least the second node master public key ($P_{1S}$) and the Generator Value (GV). The method 300 includes determining 380 the common secret (CS) based on the first node second private key ($V_{2C}$) and the second node second public key ($P_{2S}$).

Importantly, the same common secret (CS) can also be determined at the second node 7 by method 400. The method 400 includes determining 430 a first node second public key ($P_{2C}$) based on the first node master public key ($P_{1C}$) and the Generator Value (GV). The method 400 further include determining 470 a second node second private key ($V_{2S}$) based on the second node master private key ($V_{1S}$) and the Generator Value (GV). The method 400 includes determining 480 the common secret (CS) based on the second node second private key ($V_{2S}$) and the first node second public key ($P_{2C}$).

The communications network 5 may include a local area network, a wide area network, cellular networks, radio communication network, the internet, etc. These networks, where data may be transmitted via communications medium such as electrical wire, fibre optic, or wirelessly may be susceptible to eavesdropping, such as by an eavesdropper 11. The method 300, 400 may allow the first node 3 and second node 7 to both independently determine a common secret without transmitting the common secret over the communications network 5.

Thus one advantage is that the common secret (CS) may be determined securely and independently by each node without having to transmit a private key over a potentially unsecure communications network 5. In turn, the common secret may be used as a secret key (or as the basis of a secret key).

Figure 8:
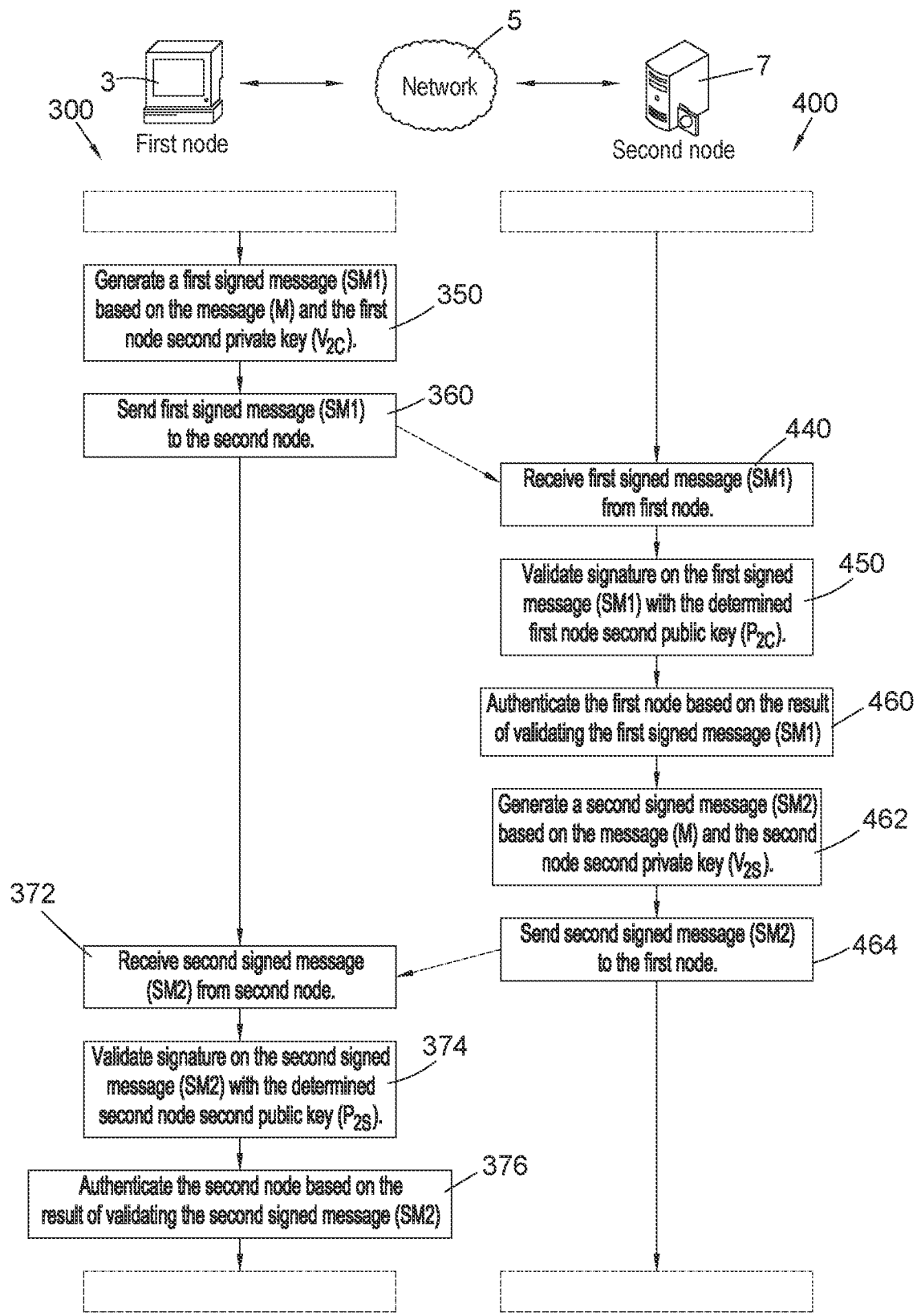

The methods 300, 400 may include additional steps. See FIG. 8. The method 300 may include, at the first node 3, generating a signed message (SM1) based on the message (M) and the first node second private key ($V_{2C}$). The method 300 further includes sending 360 the first signed message (SM1), over the communications network, to the second node 7. In turn, the second node 7 may perform the steps of receiving 440 the first signed message (SM1). The method 400 also includes the step of validating 450 the first signed message (SM2) with the first node second public key ($P_{2C}$) and authenticating 460 the first node 3 based on the result of validating the first signed message (SM1). Advantageously, this allows the second node 7 to authenticate that the purported first node (where the first signed message was generated) is the first node 3. This is based on the assumption that only the first node 3 has access to the first node master private key ($V_{1C}$) and therefore only the first node 3 can determine the first node second private key ($V_{2C}$) for generating the first signed message (SM1). It is to be appreciated that similarly, a second signed message (SM2)

can be generated at the second node 7 and sent to the first node 3 such that the first node 3 can authenticate the second node 7, such as in a peer-to-peer scenario.

Sharing the message (M) between the first and second nodes may be achieved in a variety of ways. In one example, the message may be generated at the first node 3 which is then sent, over the communications network 5, the second node 7. Alternatively, the message may be generated at the second node 7 and then sent, over the communications network 5, to the second node 7. In some examples, the message (M) may be public and therefore may be transmitted over an unsecure network 5. One or more messages (M) may be stored in a data store 13, 17, 19. The skilled person will realise that sharing of the message can be achieved in a variety of ways.

Advantageously, a record to allow recreation of the common secret (CS) may be kept without the record by itself having to be stored privately or transmitted securely.

Method of Registration 100, 200

An example of a method of registration 100, 200 will be described with reference to FIG. 6, where method 100 is performed by the first node 3 and method 200 is performed by the second node 7. This includes establishing the first and second asymmetric cryptography pairs for the respective first and second nodes 3, 7.

The asymmetric cryptography pairs include associated private and public keys, such as those used in public-key encryption. In this example, the asymmetric cryptography pairs are generated using Elliptic Curve Cryptography (ECC) and properties of elliptic curve operations.

In the method 100, 200, this includes the first and second nodes agreeing 110, 210 on a common ECC system and using a base point (G). (Note: the base point could be referred to as a Common Generator, but the term 'base point' is used to avoid confusion with the Generator Value GV). In one example, the common ECC system may be based on secp256K1 which is an ECC system used by Bitcoin. The base point (G) may be selected, randomly generated, or assigned.

Turning now to the first node 3, the method 100 includes settling 110 on the common ECC system and base point (G). This may include receiving the common ECC system and base point from the second node 7, or a third node 9. Alternatively, a user interface 15 may be associated with the first node 3, whereby a user may selectively provide the common ECC system and/or base point (G). In yet another alternative one or both of the common ECC system and/or base point (G) may be randomly selected by the first node 3. The first node 3 may send, over the communications network 5, a notice indicative of using the common ECC system with a base point (G) to the second node 7. In turn, the second node 7 may settle 210 by sending a notice indicative of an acknowledgment to using the common ECC system and base point (G).

The method 100 also includes the first node 3 generating 120 a first asymmetric cryptography pair that includes the first node master private key ($V_{1C}$) and the first node master public key ($P_{1C}$). This includes generating the first master private key ($V_{1C}$) based, at least in part, on a random integer in an allowable range specified in the common ECC system. This also includes determining the first node master public key ($P_{1C}$) based on elliptic curve point multiplication of the first node master private key ($P_{1C}$) and the base point (G) according to the formula:

$$P_{1C}=V_{1C}\times G \quad \text{(Equation 1)}$$

Thus the first asymmetric cryptography pair includes:
- $V_{1C}$: The first node master private key that is kept secret by the first node.
- $P_{1C}$: The first node master public key that is made publicly known.

The first node 3 may store the first node master private key ($V_{1C}$) and the first node master public key ($P_{1C}$) in a first data store 13 associated with the first node 3. For security, the first node master private key ($V_{1C}$) may be stored in a secure portion of the first data store 13 to ensure the key remains private.

Figure 6:
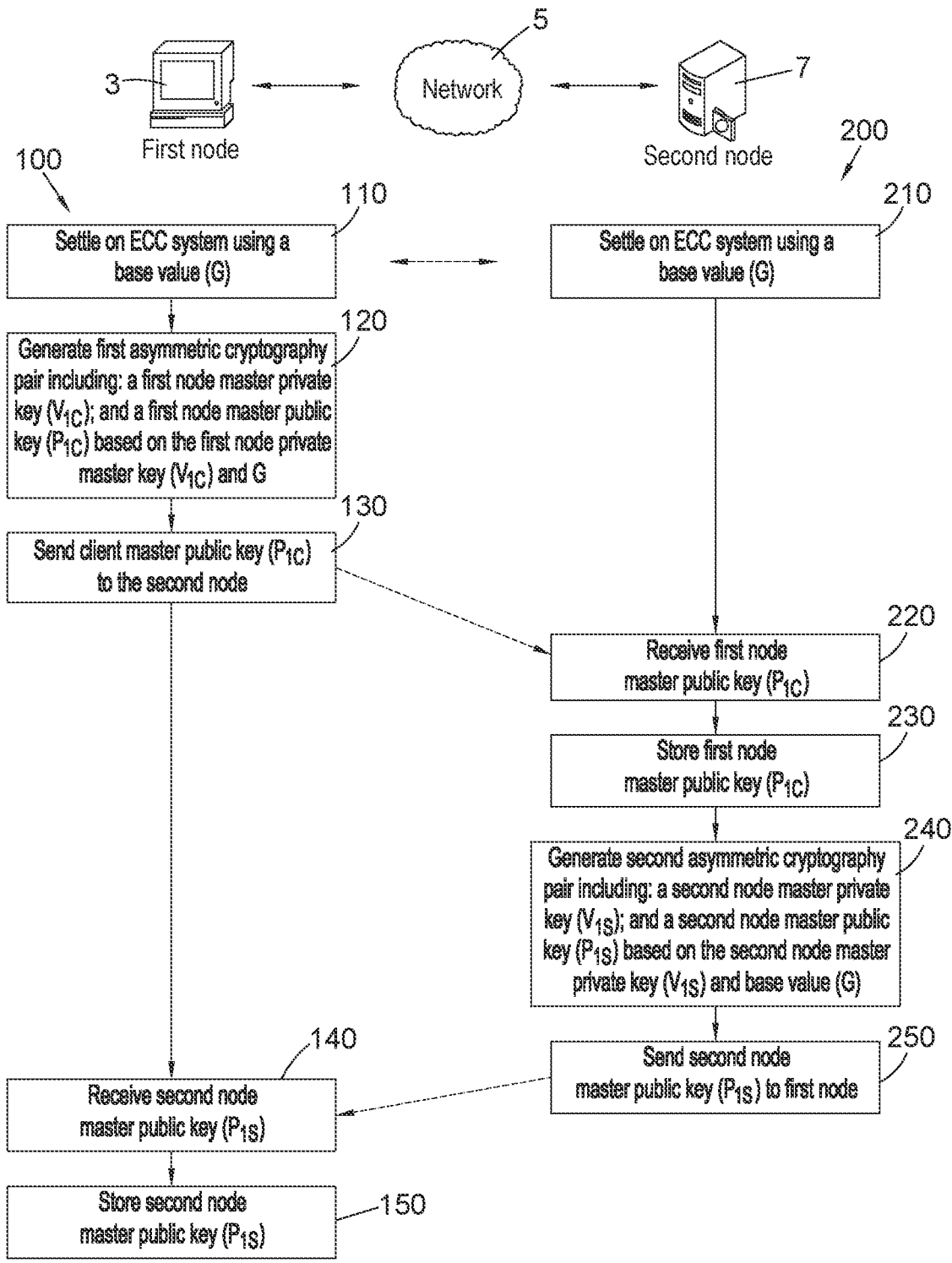

The method 100 further includes sending 130 the first node master public key ($P_{1C}$), over the communications network 5, to the second node 7, as shown in FIG. 6. The second node 7 may, on receiving 220 the first node master public key ($P_{1C}$), store 230 the first node master public key ($P_{1C}$) in a second data store 17 associated with the second node 7.

Similar to the first node 3, the method 200 of the second 7 includes generating 240 a second asymmetric cryptography pair that includes the second node master private key ($V_{1S}$) and the second node master public key ($P_{1S}$). The second node master private key ($V_{1S}$) is also a random integer within the allowable range. In turn, the second node master public key ($P_{1S}$) is determined by the following formula:

$$P_{1S}=V_{1S}\times G \quad \text{(Equation 2)}$$

Thus the second asymmetric cryptography pair includes:
- $V_{1S}$: The second node master private key that is kept secret by the second node.
- $P_{1S}$: The second node master public key that is made publicly known.

The second node 7 may store the second asymmetric cryptography pair in the second data store 17. The method 200 further includes sending 250 the second node master public key ($P_{1S}$) to the first node 3. In turn, the first node 3 may receive 140 and stores 150 the second node master public key ($P_{1S}$).

It is to be appreciated that in some alternatives, the respective public master keys may be received and stored at a third data store 19 associated with the third node 9 (such as a trusted third party). This may include a third party that acts as a public directory, such as a certification authority. Thus in some examples, the first node master public key ($P_{1C}$) may requested and received by the second node 7 only when determining the common secret (CS) is required (and vice versa).

The registration steps may only need to occur once as an initial setup.

Session Initiation and Determining the Common Secret by the First Node 3

Figure 7:
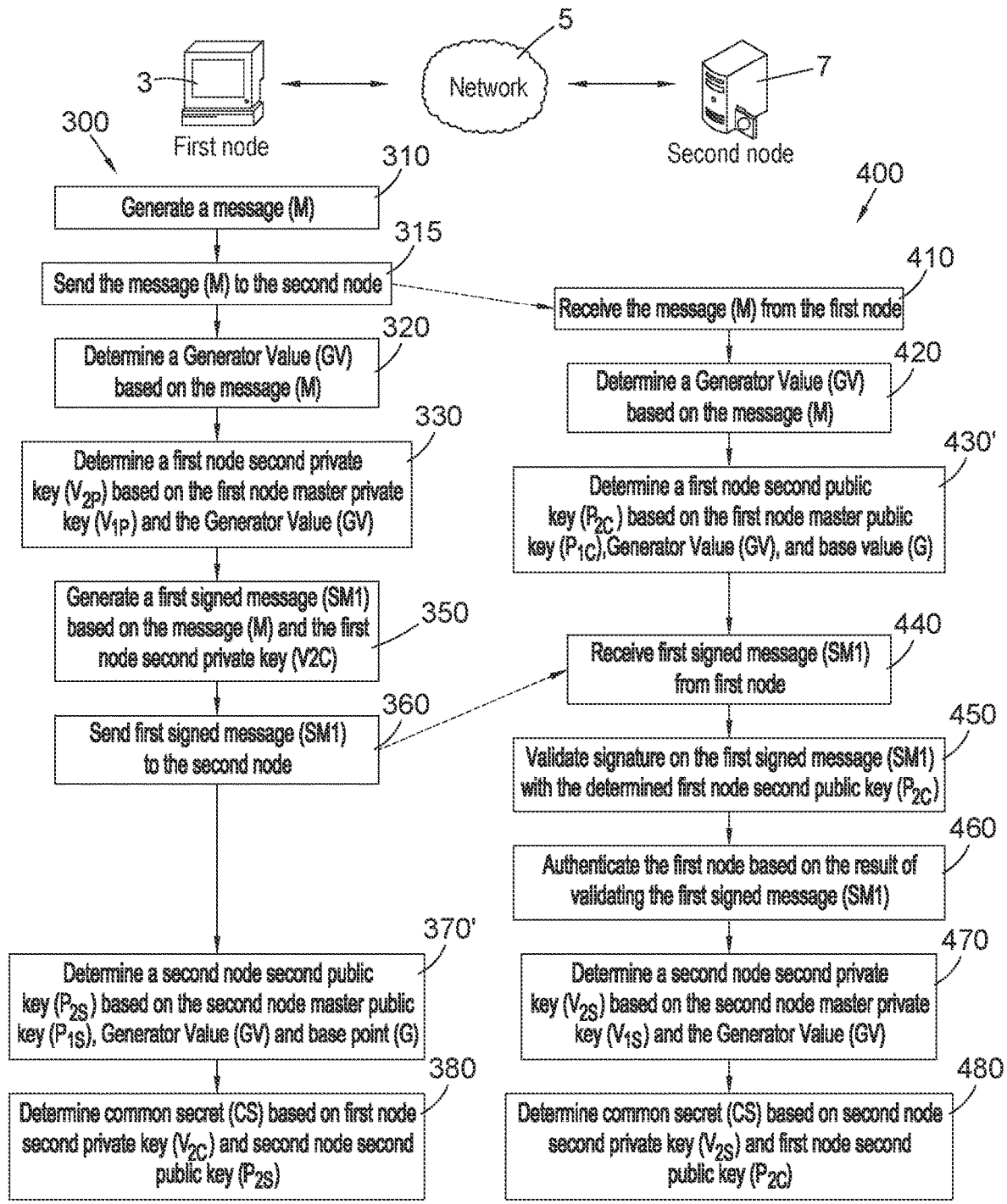

An example of determining a common secret (CS) will now be described with reference to FIG. 7. The common secret (CS) may be used for a particular session, time, transaction, or other purpose between the first node 3 and the second node 7 and it may not be desirable, or secure, to use the same common secret (CS). Thus the common secret (CS) may be changed between different sessions, time, transactions, etc.

The following is provided for illustration of the secure transmission technique which has been described above.
Generating a message (M) 310

In this example, the method 300 performed by the first node 3 includes generating 310 a message (M). The message (M) may be random, pseudo random, or user defined. In one example, the message (M) is based on Unix time and a nonce (and arbitrary value). For example, the message (M) may be provided as:

$$\text{Message } (M) = \text{UnixTime} + \text{nonce} \quad \text{(Equation 3)}$$

In some examples, the message (M) is arbitrary. However it is to be appreciated that the message (M) may have selective values (such as Unix Time, etc) that may be useful in some applications.

The method 300 includes sending 315 the message (M), over the communications network 3, to the second node 7. The message (M) may be sent over an unsecure network as the message (M) does not include information on the private keys.

Determining a Generator Value (GV) 320

The method 300 further includes the step of determining 320 a Generator Value (GV) based on the message (M). In this example, this includes determining a cryptographic hash of the message. An example of a cryptographic hash algorithm includes SHA-256 to create a 256-bit Generator Value (GV). That is:

$$GV = \text{SHA-256}(M) \quad \text{(Equation 4)}$$

It is to be appreciated that other hash algorithms may be used. This may include other has algorithms in the Secure Hash Algorithm (SHA) family. Some particular examples include instances in the SHA-3 subset, including SHA3-224, SHA3-256, SHA3-384, SHA3-512, SHAKE128, SHAKE256. Other hash algorithms may include those in the RACE Integrity Primitives Evaluation Message Digest (RIPEMD) family. A particular example may include RIPEMD-160. Other hash functions may include families based on Zémor-Tillich hash function and knapsack-based hash functions.

Determining a First Node Second Private Key 330

The method 300 then includes the step 330 of determining 330 the first node second private key ($V_{2C}$) based on the second node master private key ($V_{1C}$) and the Generator Value (GV). This can be based on a scalar addition of the first node master private key ($V_{1C}$) and the Generator Value (GV) according to the following formula:

$$V_{2C} = V_{1C} + GV \quad \text{(Equation 5)}$$

Thus the first node second private key ($V_{2C}$) is not a random value but is instead deterministically derived from the first node master private key. The corresponding public key in the cryptographic pair, namely the first node second public key ($P_{2C}$), has the following relationship:

$$P_{2C} = V_{2C} \times G \quad \text{(Equation 6)}$$

Substitution of $V_{2C}$ from Equation 5 into Equation 6 provides:

$$P_{2C} = (V_{1C} + GV) \times G \quad \text{(Equation 7)}$$

where the '+' operator refers to elliptic curve point addition. Noting that elliptic curve cryptography algebra is distributive, Equation 7 may be expressed as:

$$P_{2C} = V_{1C} \times G + GV \times G \quad \text{(Equation 8)}$$

Finally, Equation 1 may be substituted into Equation 7 to provide:

$$P_{2C} = P_{1C} + GV \times G \quad \text{(Equation 9.1)}$$

$$P_{2C} = P_{1C} + \text{SHA-256}(M) \times G \quad \text{(Equation 9.2)}$$

Thus the corresponding first node second public key ($P_{2C}$) can be derivable given knowledge of the first node master public key ($P_{1C}$) and the message (M). The second node 7 may have such knowledge to independently determine the first node second public key ($P_{2C}$) as will be discussed in further detail below with respect to the method 400.

Generate a First Signed Message (SM1) Based on the Message and the First Node Second Private Key 350

The method 300 further includes generating 350 a first signed message (SM1) based on the message (M) and the determined first node second private key ($V_{2C}$). Generating a signed message includes applying a digital signature algorithm to digitally sign the message (M). In one example, this includes applying the first node second private key ($V_{2C}$) to the message in an Elliptic Curve Digital Signature Algorithm (ECDSA) to obtain the first signed message (SM1). Examples of ECDSA include those based on ECC systems with secp256k1, secp256r1, secp384r1, se3cp521r1.

The first signed message (SM1) can be verified with the corresponding first node second public key ($P_{2C}$) at the second node 7. This verification of the first signed message (SM1) may be used by the second node 7 to authenticate the first node 3, which will be discussed in the method 400 below.

Determine a Second Node Second Public Key 370'

The first node 3 may then determine 370 a second node second public key ($P_{2S}$). As discussed above, the second node second public key ($P_{2S}$) may be based at least on the second node master public key ($P_{1S}$) and the Generator Value (GV). In this example, since the public key is determined 370' as the private key with elliptic curve point multiplication with the base point (G), the second node second public key ($P_{2S}$) can be expressed, in a fashion similar to Equation 6, as:

$$P_{2S} = V_{2S} \times G \quad \text{(Equation 10.1)}$$

$$P_{2S} = P_{1S} + GV \times G \quad \text{(Equation 10.2)}$$

The mathematical proof for Equation 10.2 is the same as described above for deriving Equation 9.1 for the first node second public key ($P_{2C}$). It is to be appreciated that the first node 3 can determine 370 the second node second public key independently of the second node 7.

Determine the Common Secret 380 at the First Node 3

The first node 3 may then determine 380 the common secret (CS) based on the determined first node second private key ($V_{2C}$) and the determined second node second public key ($P_{2S}$). The common secret (CS) may be determined by the first node 3 by the following formula:

$$S = V_{2C} \times P_{2S} \quad \text{(Equation 11)}$$

Method 400 Performed at the Second Node 7

The corresponding method 400 performed at the second node 7 will now be described. It is to be appreciated that some of these steps are similar to those discussed above that were performed by the first node 3.

The method 400 includes receiving 410 the message (M), over the communications network 5, from the first node 3. This may include the message (M) sent by the first node 3 at step 315. The second node 7 then determines 420 a Generator Value (GV) based on the message (M). The step of determining 420 the Generator Value (GV) by the second node 7 is similar to the step 320 performed by the first node described above. In this example, the second node 7 performs this determining step 420 independent of the first node 3.

The next step includes determining 430 a first node second public key ($P_{2C}$) based on the first node master public key ($P_{1C}$) and the Generator Value (GV). In this example, since the public key is determined 430' as the private key with elliptic curve point multiplication with the base point (G), the first node second public key ($P_{2C}$) can be expressed, in a fashion similar to Equation 9, as:

$$P_{2C}=V_{2C} \times G \quad \text{(Equation 12.1)}$$

$$P_{2C}=P_{1C}+GV \times G \quad \text{(Equation 12.2)}$$

The mathematical proof for Equations 12.1 and 12.2 is the same as those discussed above for Equations 10.1 and 10.2.

The Second Node 7 Authenticating the First Node 3

The method 400 may include steps performed by the second node 7 to authenticate that the alleged first node 3, is the first node 3. As discussed previously, this includes receiving 440 the first signed message (SM1) from the first node 3. The second node 7 may then validate 450 the signature on the first signed message (SM1) with the first node second public key ($P_{2C}$) that was determined at step 430.

Verifying the digital signature may be done in accordance with an Elliptic Curve Digital Signature Algorithm (ECDSA) as discussed above. Importantly, the first signed message (SM1) that was signed with the first node second private key ($V_{2C}$) should only be correctly verified with the corresponding first node second public key ($P_{2C}$), since $V_{2C}$ and $P_{2C}$ form a cryptographic pair. Since these keys are deterministic on the first node master private key ($V_{1C}$) and the first node master public key ($P_{1C}$) that were generated at registration of the first node 3, verifying first signed message (SM1) can be used as a basis of authenticating that an alleged first node sending the first signed message (SM1) is the same first node 3 during registration. Thus the second node 7 may further perform the step of authenticating (460) the first node 3 based on the result of validating (450) the first signed message.

The Second Node 7 Determining the Common Secret

The method 400 may further include the second node 7 determining 470 a second node second private key ($V_{2S}$) based on the second node master private key ($V_{1S}$) and the Generator Value (GV). Similar to step 330 performed by the first node 3, the second node second private key ($V_{2S}$) can be based on a scalar addition of the second node master private key ($V_{1S}$) and the Generator Value (GV) according to the following formulas:

$$V_{2S}=V_{1S}+GV \quad \text{(Equation 13.1)}$$

$$V_{2S}=V_{1S}+\text{SHA-256}(M) \quad \text{(Equation 13.2)}$$

The second node 7 may then, independent of the first node 3, determine 480 the common secret (CS) based on the second node second private key ($V_{2S}$) and the first node second public key ($P_{2C}$) based on the following formula:

$$S=V_{2S} \times P_{2C} \quad \text{(Equation 14)}$$

Proof of the Common Secret (CS) Determined by the First Node 3 and Second Node 7

The common secret (CS) determined by the first node 3 is the same as the common secret (CS) determined at the second node 7. Mathematical proof that Equation 11 and Equation 14 provide the same common secret (CS) will now be described.

Turning to the common secret (CS) determined by the first node 3, Equation 10.1 can be substituted into Equation 11 as follows:

$$S=V_{2C} \times P_{2S} \quad \text{(Equation 11)}$$

$$S=V_{2C} \times (V_{2S} \times G)$$

$$S=(V_{2C} \times V_{2S}) \times G \quad \text{(Equation 15)}$$

Turning to the common secret (CS) determined by the second node 7, Equation 12.1 can be substituted into Equation 14 as follows:

$$S=V_{2S} \times P_{2C} \quad \text{(Equation 14)}$$

$$S=V_{2S} \times (V_{2C} \times G)$$

$$S=(V_{2S} \times V_{2C}) \times G \quad \text{(Equation 16)}$$

Since ECC algebra is commutative, Equation 15 and Equation 16 are equivalent, since:

$$S=(V_{2C} \times V_{2S}) \times G=(V_{2S} \times V_{2C}) \times G \quad \text{(Equation 17)}$$

The Common Secret (CS) and Secret Key

The common secret (CS) may now be used as a secret key, or as the basis of a secret key in a symmetric-key algorithm for secure communication between the first node 3 and second node 7.

The common secret (CS) may be in the form of an elliptic curve point ($x_S$, $y_S$). This may be converted into a standard key format using standard publicly known operations agreed by the nodes 3, 7. For example, the $x_S$ value may be a 256-bit integer that could be used as a key for $AES_{256}$ encryption. It could also be converted into a 160-bit integer using RIPEMD160 for any applications requiring this length key.

The common secret (CS) may be determined as required. Importantly, the first node 3 does not need to store the common secret (CS) as this can be re-determined based on the message (M). In some examples, the message(s) (M) used may be stored in data store 13, 17, 19 (or other data store) without the same level of security as required for the master private keys. In some examples, the message (M) may be publicly available.

However depending on some application, the common secret (CS) could be stored in the first data store (X) associated with the first node provided the common secret (CS) is kept as secure as the first node master private key ($V_{1C}$).

Advantageously, this technique can be used to determine multiple common secrets that may correspond to multiple secure secret keys based on a single master key cryptography pair.

Hierarchy of Generator Values (Keys)

For example, a series of successive Generator Values (GVs) may be determined, where each successive GV may be determined based on the preceding Generator Value (GV). For example, instead of repeating steps 310 to 370 and 410 to 470 to generate successive single-purpose keys, by prior agreement between the nodes, the previously used Generator Value (GV) can be rehashed repeatedly by both parties to establish a hierarchy of Generator Values. In effect, the Generator Value, based on the hash of a message (M), can be a next generation message (M') for the next generation of Generator Value (GV'). Doing this allows successive generations of shared secrets to be calculated without the need for further protocol-establishment transmissions, in particular transmission of multiple messages for each generation of common secrets. The next generation common secret (CS') can be computed as follows.

Firstly, both the first node 3 and the second node 7 independently determine the next generation of the Generator Value (GV'). This is similar to steps 320 and 420 but adapted with the following formulas:

$$M'=\text{SHA-256}(M) \quad \text{(Equation 18)}$$

$$GV'=\text{SHA-256}(M') \quad \text{(Equation 19.1)}$$

$$GV'=\text{SHA-256}(\text{SHA-256}(M)) \quad \text{(Equation 19.2)}$$

The first node 3 may then determine the next generation of the second node second public key ($P_{2S}'$) and the first node second private key ($V_{2C}'$) similar to steps 370 and 330 described above, but adapted with the following formulas:

$$P_{2S}'=P_{1S}+GV'\times G \quad \text{(Equation 20.1)}$$

$$V_{2C}'=V_{1C}+GV' \quad \text{(Equation 20.2)}$$

The second node 7 may then determine the next generation of the first node second public key ($P_{2C}'$) and the second node second private key ($V_{2S}'$) similar to steps 430 and 470 described above, but adapted with the following formulas:

$$P_{2C}'=P_{1C}+GV'\times G \quad \text{(Equation 21.1)}$$

$$V_{2S}'=V_{1S}+GV' \quad \text{(Equation 21.2)}$$

The first node 3 and the second node 7 may then each determine the next generation common secret (CS'). In particular, the first node 3 determines the next generation common secret (CS') with the formula:

$$CS'=V_{2C}'\times P_{2S}' \quad \text{(Equation 22)}$$

The second node 7 determines the next generation common secret (CS') with the formula:

$$CS'=V_{2S}'\times P_{2C}' \quad \text{(Equation 23)}$$

Further generations (CS", CS''', etc.) can be calculated in the same way to create a chain hierarchy. This technique requires that both the first node 3 and the second node 7 keep track of the original Message (M) or the originally calculated Generator Value (GV), and to which node it relates. As this is publicly known information there are no security issues regarding the retention of this information. Accordingly, this information might be kept on 'hash tables' (linking hash values to public keys) and distributed freely across the network 5 (for example using Torrent). Furthermore, if any individual common secret (CS) in the hierarchy is ever compromised, this does not affect the security of any other common secrets in the hierarchy provided the private keys $V_{1C}$, $V_{1S}$ remain secure.

Tree Structure of Keys

As well as a chain (linear) hierarchy as described above, a hierarchy in the form of a tree structure can be created. With a tree structure, a variety of keys for different purposes such as authentication keys, encryption keys, signing keys, payment keys, etc. may be determined whereby these keys are all linked to a single securely maintained master key. This is best illustrated in FIG. 12 that shows a tree structure 901 with a variety of different keys. Each of these can be used to create a shared secret with another party. Tree branching can be accomplished in several ways, three of which are described below.

(i) Master Key Spawning

In the chain hierarchy, each new 'link' (Public/Private key pair) is created by adding a multiply rehashed Message to the original master key. For example, (showing only the private key of the first node 3 for clarity):

$$V_{2C}=V_{1C}+\text{SHA-256}(M) \quad \text{(Equation 24)}$$

$$V_{2C}'=V_{1C}+\text{SHA-256}(\text{SHA-256}(M)) \quad \text{(Equation 25)}$$

$$V_{2C}''=V_{1C}+\text{SHA-256}(\text{SHA-256}(\text{SHA-256}(M))) \quad \text{(Equation 26)}$$

. . . and so on.

To create a branch, any key can be used as a sub-master key. For example $V_{2C}'$ can be used as a sub-master key ($V_{3C}$) by adding the hash to it as is done for the regular master key:

$$V_{3C}=V_{2C}'+\text{SHA-256}(M) \quad \text{(Equation 27)}$$

The sub-master key ($V_{3C}$) may itself have a next generation key ($V_{3C}'$), for example:

$$V_{3C}'=V_{2C}'+\text{SHA-256}(\text{SHA-256}(M)) \quad \text{(Equation 28)}$$

This provides a tree structure 903 using the master key spawning method as shown in FIG. 13.

(ii) Logical Association

In this method all the nodes in the tree (public/private key pairs) are generated as a chain (or in any other way) and the logical relationships between the nodes in the tree is maintained by a table in which each node in the tree is simply associated with its parent node in the tree using a pointer. Thus the pointer may be used to determine the relevant public/private key pairs for determining the common secret key (CS) for the session.

(iii) Message Multiplicity

New private/public key pairs can be generated by introducing a new message at any point in the chain or tree. The message itself may be arbitrary or may carry some meaning or function (e.g. it might be related to a 'real' bank account number, etc). It may be desirable that such new messages for forming the new private/public key pairs are securely retained.

Codification Scheme

The metadata of the transaction may be used to access instructions stored in an off-block document. This document might be referred to as a 'contract'. The metadata which is used to reference the contract can be formatted in a variety of ways. However, a suitable codification scheme is described here.

A contract is transferable if the rights it defines are conferred upon the holder or owner of the contract. An example of a non-transferable contract is one in which the participants are named—that is, where the rights are conferred upon a specific named entity rather than the holder of the contract. Only transferable contracts are discussed in this codification scheme.

A token represents a specific contract that details or defines rights conferred by a contract. In accordance with the present invention, the token is a representation of the contract in the form of a bitcoin transaction.

This codification method uses metadata comprising three parameters or data items. This data may be indicative of:

i) an amount of shares available under the contract (this may be referred to herein as 'NumShares');
  ii) a quantity of transfer units to be transferred from a sender to at least one recipient (this may be referred to herein as 'ShareVal'); and
  iii) a factor for calculating a value for the quantity of transfer units (this may be referred to herein as a 'pegging rate').

An advantage of this codification scheme is that it can be used to encapsulate or represent contracts as tokens on a blockchain using only the three parameters described above. In effect, the contract can be specified using a minimum of these three data items. As this codification scheme can be used for any type of transferable contract, common algorithms can be devised and applied. Further detail of these metadata items is provided as follows.

A divisible token is one in which the value on a transaction output may be subdivided into smaller amounts allocated across multiple tokens (i.e. allocated across multiple transactions). The archetype is tokenised fiat currency. Divisible contracts are defined as those that specify a non-zero PeggingRate. For divisible contracts the tokenised value transferred in the transaction output is tied to the underlying bitcoin (BTC) value via the PeggingRate. That is, the contract specifies the holder's rights in terms of a pegging-rate. For non-divisible tokens there is no PeggingRate and the contract specifies the holder's rights in terms of a fixed value (e.g. like a bearer bond: 'this contract is redeemable for exactly $1000' or a voucher 'this contract is redeemable for one haircut'). For non-divisible contracts the underlying transaction BTC value is irrelevant to the contract value.

The phrase "Underlying BTC value" refers to the bitcoin amount (BTC) attached to the transaction output. In the Bitcoin protocol every transaction output must have non-zero BTC amount to be considered valid. In fact, the BTC amount must be greater than a set minimum (known as 'dust') which, at the time of writing, is currently set to 546 satoshis. 1 bitcoin is defined as being equal to 100 million satoshis. As the bitcoin transactions are here used only as a means of facilitating an exchange of ownership, the actual underlying BTC amount is arbitrary: the true value lies in the contract specification. In theory every token could be carried by dust.

In accordance with the present codification scheme, specifically for divisible tokens, the underlying BTC value does have a meaning: it bears a relationship to the contract value via a PeggingRate. The PeggingRate is itself arbitrary and is chosen so as to keep the underlying BTC amount small. The reason for using a PeggingRate rather than simply underlying every token transaction with dust is because the protocol of the present invention facilitates divisibility: when a token is split into several transaction outputs of smaller amounts it is not necessary to adjust the original contract. Rather, the contract value of each subdivided token is simply calculated based on the PeggingRate and the subdivided amount of underlying BTC value.

A limited token is one in which a total issuance value is fixed (or 'limited') by a fixed non-zero number of shares as defined by a quantity called NumShares. Therefore, no further shares may be issued under a limited contract. For example, a contract for part ownership of a race horse is limited to 100% of the race horse (e.g. 100 shares at 1% each or 10 shares at 10% each, etc.). An unlimited contract implies that the issuer is able to underwrite further issuances of shares, for example by adding the required amount of fiat currency into their Reserve Account. NumShares must be explicitly stated on all contracts. Limited contracts must have NumShares>0; unlimited contracts are denoted by setting NumShares=0.

The archetypical example is a currency reserve (analogous to a gold reserve) such that the total value held in the reserve bank account matches the total value in promissory notes in existence (i.e., unredeemed tokens). This concept extends beyond currency reserves to include stock inventory. For example, an issuer of licensed printed t-shirt tokens may start with an inventory of 10,000 T-shirts in stock and may issue a divisible token to represent those 10,000 t-shirts (where, say, each share=1 t-shirt). The original token could be subdivided and each subdivided token would be redeemable for a number of t-shirts according to the transaction output's underlying BTC value as defined by the PeggingRate. If demand increases, however, the issuer may decide to issue further shares (i.e., increase the number of shares in circulation by (say) another 10,000). In such cases it is incumbent on the issuer to deposit a further 10,000 t-shirts into his reserve account (i.e., stock warehouse) in order to underwrite the further issuance. Thus, the total number of t-shirts in stock (where stock acts as 'reserve account') at any one time=the total number of unredeemed shares.

PeggingRates only apply to divisible contracts, wherein the value of a share (represented by a quantity called ShareVal) is pegged to the underlying BTC amount. For example, the contract might specify that the issuer promises to redeem the token at a rate of $10,000 for every underlying 1 BTC. That would mean (for example) that a transaction with a tokenised underlying output value of 15,400 satoshis would be redeemable for $1.54. A value of 0 for the PeggingRate indicates that the contract is non-divisible (i.e. can only be transferred whole, like a bearer bond). When the PeggingRate is set to 0 (meaning non-divisible token) the underlying BTC value is not relevant to the contract value and can be set at any amount. Normally in this case it is desirable to keep the underlying BTC amount as small as possible (i.e. set to dust) to minimise operating costs.

NumShares is the total (fixed) number of shares available under the (Limited) contract. For limited contracts NumShares must be a whole number greater than zero. For unlimited contracts NumShares is not fixed as more shares can be issued at any time (provided they are underwritten), which is denoted by setting the value to 0.

A share is defined as the unit of transfer and the ShareVal is the value of that unit. For example, for fiat currency, the unit of transfer may be set to 1 cent. Or, for example, it may be set to 50 cents, in which case transfers may only be executed in 'lots' of 50 cents. ShareVal may also be expressed as a percentage: for example if a breeder wants to sell a racehorse in 10 equal shares then the ShareVal=10%. ShareVal must be >0 and must be defined on the contract.

TotalIssuance represents the total value of shares issued. This value only relates to limited contracts as for unlimited contracts the issuance is not fixed and more shares may be issued. If the shares are expressed as a percentage then the TotalIssuance=100% by definition.

For limited contracts NumShares, ShareVal, and TotalIssuance are related in the following way:

$$NumShares \times ShareVal = TotalIssuance.$$

A value of 0 for TotalIssuance implies it is an unlimited contract. An example of an unlimited contract is fiat currency (so TotalIssuance is set to 0); examples of limited contracts are: (i) limited edition commemorative coins (1000 minted, where 1 share=1 coin): TotalIssuance=1000×1=1000 coins; and (ii) seats at a ticketed venue, where TotalIssuance=total number of seats available.

The circulation is defined as the total value of unspent tokens (i.e., as determined by transactions in UTXO−unspent transaction output). The full set of all unspent transactions is kept in a list available to all bitcoin nodes. For example, if an issuer initially issues $10,000 as fiat currency type tokens and over time $5500 worth of tokens are redeemed, then the circulation=$4500 (being the value of unredeemed tokens). This value should reconcile to the balance in the associated reserve account.

AN ILLUSTRATIVE EXAMPLE OF A COMPUTING RESOURCE ('AGENT') Suitable for Use with Embodiments of the Invention The present invention can utilise a suitably arranged computing resource (herein "agent") to perform automated aspects of a desired process. An example of a suitable and preferable agent is provided below, although other implementations may be used.

The agent may operate in conjunction with the blockchain, using it as the non-erasable tape in the implementation of a Turing machine. This agent runs in parallel with the blockchain network, overseeing and handling the execution of a (looping) process. The looping process is designed to perform a given task such as, for example, the automation of a process or control of a device or system. This parallel resource monitors the state of the blockchain and can cause transactions to be written to the blockchain. In one sense, it utilises the Blockchain as a non-erasable tape of the Turing Machine, with the following definitions and features:
1. the Blockchain acts as the tape of the Turing Machine. Each transaction in the Blockchain represents a cell on the tape. This cell can contain symbols from a finite alphabet.
2. The tape head can read information from the blocks that have already been written onto the Blockchain.
3. The tape head can write new blocks, containing many transactions, to the end of the Blockchain. However, they cannot write onto blocks that already exist. As such, the Blockchain tape is non-erasable.
4. Metadata for each transaction can be stored as part of a multi-signature pay-to-script-hash (P2SH) transaction.

An important function of the agent is to act as an automated entity that monitors the current state of the Blockchain. It can also receive a signal or input from any off-block source. Depending on the Blockchain state and/or a received input, the agent may perform certain actions. The agent decides which action(s) are to be performed. These may or may not involve actions in the 'real world' (i.e. off block) and/or actions on the Blockchain (such as creating and broadcasting new transactions). The action that the agent takes may be triggered by the Blockchain state. The agent may also decide on the next set of transactions to be broadcast to the Bitcoin network, and subsequently written to the Blockchain.

The agent's action(s) run in parallel and simultaneously to the Blockchain (e.g., Bitcoin) network. In a sense, this extends the function of blockchain (e.g., Bitcoin) script. This continuous monitoring implements the 'loop' control-flow constructs making the combined agent and Blockchain system Turing Complete.

The Turing Machine includes two stacks:
Data stack: This is represented by the Blockchain as described above.
Control stack: This is represented by the agent function. This stores information relating to the repeat control-flow function.

The separation of the control stack from the data stack provides the advantage of preventing infinite loops from occurring within the Bitcoin core, mitigating denial-of-service attacks.

The agent manages and runs subroutines that are able to loop via any type of loop construct (e.g. FOR-NEXT; REPEAT UNTIL; etc). An illustrative embodiment described herein includes a process using one example of the 'repeat' construct. The user may specify the index (i) and the limit (J). These represent the current iteration number (typically counted starting from 0) and the total number of iterations of the repeat loop respectively.

For each iteration:
1. The Index increments by 1. For the exit condition, the iterations will stop when the index reaches the limit
2. A code block containing an "if condition then action" (ICTA) statement is executed; the action may be any action on or off the blockchain;
3. A cryptographic hash of this subroutine is computed. This can be stored in the Blockchain as part of a transaction. Since the hash is unique to each code, it will enable verification of which code has been used The body of the loop includes a code block. Each code block contains a "If condition then action" (ICTA) statement. This monitors the current state of the Blockchain for transactions matching the:
Start or triggering condition (e.g., when a particular date is reached).
Repeat condition (i.e. a metadata or hash associated with the previous iteration).
Stop condition (i.e. last iteration of the loop).

The ICTA statement enables the agent to decide on the next transaction to make, based on the current state of the blockchain. Making the next transaction involves broadcasting the transaction onto the Bitcoin network, and writing the new transaction onto the Blockchain. This acts as a record that this iteration has been executed. Once the transaction has been written onto the Blockchain, the Manager will subsequently find that the previous iteration has been executed and written onto the Blockchain, and will execute the next iteration. The latter continues until the repeat loop exits when the index (i) reaches the limit (J) specified in the code block.

Each transaction is saved in the blockchain in a way that can be reused. In a Bitcoin implementation, each signature in a transaction is appended with a SIGHASH flag. This flag can take on different values, each indicating whether other parts of the transaction can be amended without involvement of the owner of this signature. A reusable transaction has the SIGHASH flag 'SigHash_AnyoneCanPay' in one of the transaction inputs. This permits anyone to contribute to the inputs of the transaction. This parameter enables the agent's ICTA function to be executed and repeated multiple times and with different inputs. Use of the function can be restricted to authorised parties—for example, via copyright of the reusable transaction.

The 'If condition' section of the ICTA code block can monitor any type of condition. This is similar to other programming languages (e.g. C, C++, Java) and not limited to information stored on the Blockchain. For example, it could monitor the date and time (i.e. when a certain date and time are reached) or monitor the weather (i.e. when the temperature is below 10° C. and it is raining), monitor the conditions of a contract or a trust (i.e. when company A buys company B).

The 'Then action' section of the ICTA code block can execute a number of actions. The invention is not limited with regard to the number or type of actions that can be taken. The action is not limited to a transaction on the Blockchain, although a transaction containing metadata related to the action may be written on the Blockchain.

The metadata can be of any form. However, in one embodiment, the metadata may store a hyperlink to a file containing more data or instructions relating to the action. The metadata may store both a hyperlink to a hash table containing more data or instructions relating to the action along with a hash of the action that acts as the look-up key for the hash table.

The agent's control stack can be implemented in a number of ways that are specific to the needs of each user. For example, the repeat loop of the control stack can be based on any Turing Complete language. One possible choice of language is the Forth style stack-based language. An advantage of using this language is that it keeps the control stack consistent in programming style with the Bitcoin scripts which are already known and in wide usage.

Using the Bitcoin Script's Alternate Stack as a Data Storage Space

The Bitcoin script contains commands, also called op codes, which enable users to move data onto an alternative stack, known as the 'aft stack'.

The op codes are:

OP_TOALTSTACK—which moves data from the top of the main stack onto the top of the alt stack.

OP_FROMALTSTACK—which moves data from the top of the alt stack to the top of the main stack.

This enables data from intermediate steps of calculations to be stored in the alt stack, similar to the 'memory' function which allows data to be stored on the calculator. In one embodiment, the alt stack is used for configuring bitcoin scripts to solve small computation tasks and returning the results in the computation.

Using a Code Register to Manage the Agent

The agent also manages a registry of all the codes that it owns and runs. This registry is structured like a lookup table or dictionary that maps a specific key to a specific value. The key and value pair is represented by the hash of the code block ($H_1$) and the IPv6 address of where the code is stored respectively. To retrieve the code block using the key $H_1$, the lookup table is used to retrieve the associated value (this is the location where the code is stored) and retrieves the source code accordingly. The implementation of the code registry can vary.

Transaction Metadata of the Agent's Code, and Re-Spawning of the Loop

Information required to respawn the agent's loop at a particular iteration is stored as metadata in the transaction recorded on the Blockchain.

In this way, a transaction on the blockchain stores or provides access to information about a given iteration of the loop which is being executed on the agent. This information can include the values of any variables associated with the loop, such as index i, and any other necessary information such as values for parameters used in the code block or location-related data specifying where further required information can be accessed.

The metadata itself is stored as part of a multi-signature pay-to-script-hash script (P2SH) in the transaction. The metadata recorded with the transaction also gives the ability to record an audit trail of how the code has been executed in the past.

There are several ways in which the agent could respawn the repeat loop code block at each iteration. The code block might be hard-coded into the agent itself, or could be stored in a private or publicly available file, or stored as an entry on a private or public hash table file, or a combination of the above. The code block could be static with hard-coded variables or could be static but contain parameter(s) that can be populated. The parameters could be single values of any data format, or could be small chunks of code, or be combinations of the above. The parameters could be populated by retrieving them directly from metadata in a transaction (e.g. bitcoin transaction) or from an external source such as an internal database or a private/public file or hash table or any combination of the above. Pointers to the external source of parameter values might be stored in metadata in a transaction.

The following steps provide one example of how the agent can respawn a repeat loop code block at the ith iteration. In this example, the code registry is a hash table whereby the hash values act as look-up keys for the table and are stored in metadata on transactions.

1. The agent monitors the Blockchain for transactions that contain hashes of the code block that matches entries in the code registry.
2. The agent finds a transaction that contains the corresponding hash ($H_1$).
3. The agent reads the 'Metadata-CodeHash', gets the CodeHash field to get $H_1$ and uses it to retrieve the code ($C_1$). If RIPEMD-160(SHA256($C_1$)) equals $H_1$, the code has not been changed and it is safe to proceed to the next step.
4. The agent reads the 'Metadata-CodeHash,' which stores the index I, and respawns the code at the $i^{th}$ iteration. In other words, the loop is 'reloaded' at the appropriate iteration
5. The signature of the User is included in the P2SH command to verify the origin of the metadata.
6. The agent reads the 'Metadata-OutputHash' and 'Metadata-OutputPointer' to retrieve the output of the previous steps, if these data are required for this iteration of the loop.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented control system for controlling a device, the system comprising:
   a device configured for communication with a network and having an IP address and a public-private key cryptographic key pair associated with the device;
   a software-implemented control component arranged to monitor the state of a blockchain network and/or transmit blockchain transactions to the blockchain network, wherein the control component is arranged to access a set of instructions from a stored location which is separate to the device; and the set of instructions arranged for execution by the control component to control the functionality of the device; wherein the set of instructions is stored in a Distributed Hash Table (DHT) and accessed for download and installation by the control component from the DHT, and the location of the DHT is indicated or provided using metadata provided within a blockchain transaction, wherein the blockchain transaction comprises an embedded XOR test including at least one condition, wherein the control component is arranged to influence or control the activities of the device based upon detection of a valid blockchain transaction, wherein the valid blockchain transaction is a blockchain transaction in which the embedded XOR test has passed the at least one condition.

2. A system according to claim 1 wherein the control component is arranged to receive an input signal from an input source, and wherein the input source is:
   a further device;
   and/or a computer-based resource or agent.

3. A system according to claim 1 wherein the set of instructions is accessed by the control component using a look-up key which is related to a cryptographic key pair.

4. A system according to claim 1 wherein the control component is provided on or in the device.

5. A system according to claim 1 wherein the control component is provided in an off-device location and arranged for wireless communication with the device.

6. A system according to claim 1 wherein the control component is arranged to:
   perform cryptographic calculations;
   access its associated private/public key pair;
   have an associated Bitcoin or other blockchain-related address;
   operate the device via an API; and
   perform secret sharing protocol operations.

7. A computer-implemented control method for controlling a device, the method comprising the steps:
   providing a device configured for wireless communication with a network and having an IP address and a public-private key cryptographic key pair associated with the device;
   providing a software-implemented control component arranged to monitor the state of a blockchain network and/or transmit blockchain transactions to the blockchain network, wherein each blockchain transaction comprises an embedded XOR test including at least one condition;
   providing a set of instructions arranged for execution by the control component to control the functionality of the device; and
   wherein:
   i) the control component is arranged to access the set of instructions from a stored location which is separate to the device and wherein the control component is arranged to influence or control the activities of the device based upon detection of a valid blockchain transaction, wherein the valid blockchain transaction is a blockchain transaction in which the embedded XOR test has passed the at least one condition;
   ii) the set of instructions is stored in a Distributed Hash Table (DHT) and accessed for download and installation by the control component from the DHT; and
   iii) the location of the DHT is indicated or provided using metadata provided within a blockchain transaction.

8. A method according to claim 7 wherein the control component is arranged to receive an input signal from an input source, and wherein the input source is:
   a further device; and/or
   a computer-based resource or agent.

9. A method according to claim 8 wherein the set of instructions is accessed by the control component using a look-up key which is related to a cryptographic key pair.

10. A method according to claim 7, wherein the control component is provided on or in the device.

11. A method according to claim 7 wherein the control component is provided in an off-device location and arranged for wireless communication with the device.

12. A method according to claim 7, wherein the control component is arranged to:
   perform cryptographic calculations;
   access its associated private/public key pair;
   have an associated Bitcoin or other blockchain-related address;
   operate the device via an API; and
   perform secret sharing protocol operations.

* * * * *